(12) United States Patent
Ishizu

(10) Patent No.: US 10,235,963 B2
(45) Date of Patent: Mar. 19, 2019

(54) COMMUNICATION APPARATUS COMMUNICABLE WITH EXTERNAL APPARATUS, CONTROL METHOD OF COMMUNICATION APPARATUS, AND STORAGE MEDIUM

(71) Applicant: CANON KABUSHIKI KAISHA, Tokyo (JP)

(72) Inventor: Akihiko Ishizu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 360 days.

(21) Appl. No.: 14/841,364

(22) Filed: Aug. 31, 2015

(65) Prior Publication Data

US 2016/0065887 A1    Mar. 3, 2016

(30) Foreign Application Priority Data

Sep. 3, 2014   (JP) .................................. 2014-179323

(51) Int. Cl.
| | |
|---|---|
| G06F 3/14 | (2006.01) |
| G06T 3/40 | (2006.01) |
| G09G 5/00 | (2006.01) |
| H04N 5/77 | (2006.01) |
| H04N 9/82 | (2006.01) |

(Continued)

(52) U.S. Cl.
CPC ........... *G09G 5/003* (2013.01); *G06T 3/4092* (2013.01); *H04N 5/23206* (2013.01); *H04N 5/772* (2013.01); *H04N 9/8047* (2013.01); *H04N 9/8205* (2013.01); *H04N 9/8227* (2013.01); *H04N 21/41407* (2013.01); *H04N 21/4223* (2013.01); *H04N 21/43637* (2013.01);

(Continued)

(58) Field of Classification Search
CPC ............. H04N 5/23206; H04N 9/8205; H04N 9/8227; H04N 9/8047; H04N 5/772; H04N 21/8153; H04N 21/41407; H04N 21/43637; H04N 21/4223; G06T 3/4092; G09G 5/003; G09G 2340/0407; G09G 2370/16; G06F 3/14
See application file for complete search history.

(56) References Cited

U.S. PATENT DOCUMENTS

2003/0218771 A1* 11/2003 Mihira ................. G06Q 20/389
                                                          358/1.15
2008/0005184 A1*  1/2008 Myllyla ............ G06F 17/30578

(Continued)

FOREIGN PATENT DOCUMENTS

| JP | 2003-204500 A | 7/2003 |
|---|---|---|
| JP | 2004-343627 A | 12/2004 |

(Continued)

*Primary Examiner* — Timothy J Henn
(74) *Attorney, Agent, or Firm* — Canon U.S.A., Inc. IP Division

(57) ABSTRACT

A communication apparatus that communicates with an external apparatus includes a connection unit that connects to a storage medium in which image data is recorded, and a control unit that, in a case where a request for a resized image of the image data is received from the external apparatus, generates a resized image by reading the image data from the storage medium in response to the request, controls transmission of the resized image to the external apparatus, and controls generating and temporarily storing metadata of the resized image.

20 Claims, 9 Drawing Sheets

(51) Int. Cl.
*H04N 21/81* (2011.01)
*H04N 5/232* (2006.01)
*H04N 9/804* (2006.01)
*H04N 21/414* (2011.01)
*H04N 21/4223* (2011.01)
*H04N 21/4363* (2011.01)

(52) U.S. Cl.
CPC ......... *H04N 21/8153* (2013.01); *G06F 3/14* (2013.01); *G09G 2340/0407* (2013.01); *G09G 2370/16* (2013.01)

(56) References Cited

U.S. PATENT DOCUMENTS

| | | | | |
|---|---|---|---|---|
| 2009/0070401 A1* | 3/2009 | Welch, Jr. | ............. | G06Q 10/10 709/201 |
| 2010/0103449 A1* | 4/2010 | Lee | ............. | G06F 3/1207 358/1.15 |
| 2010/0111501 A1* | 5/2010 | Kashima | ............. | G06T 11/60 386/212 |
| 2011/0216166 A1* | 9/2011 | Takahashi | ............. | H04N 13/02 348/46 |
| 2013/0201351 A1* | 8/2013 | Matsuda | ............. | H04N 1/00307 348/207.1 |
| 2013/0222640 A1* | 8/2013 | Baek | ............. | G11B 27/3027 348/231.99 |
| 2014/0315494 A1* | 10/2014 | Son | ............. | A61B 5/0002 455/41.2 |
| 2015/0015732 A1* | 1/2015 | Vieth | ............. | H04N 5/23229 348/222.1 |

FOREIGN PATENT DOCUMENTS

| | | |
|---|---|---|
| JP | 2007-081892 A | 3/2007 |
| JP | 2013-162303 A | 8/2013 |

\* cited by examiner

FIG.3A

| API NAME | REQUEST (ARGUMENT) | RESPONSE | DESCRIPTION |
|---|---|---|---|
| RequestProductInfo | NONE | · PRODUCT NAME<br>· MANUFACTURER NAME<br>· FIRMWARE VERSION<br>· SERIAL NUMBER | OBTAIN PRODUCT INFORMATION OF DIGITAL CAMERA |
| RequestMemoryInfo | NONE | · STORAGE AREA ID<br>· STORABLE CAPACITY<br>· FREE CAPACITY<br>· NUMBER OF STORED CONTENTS | OBTAIN STORAGE AREA INFORMATION OF DIGITAL CAMERA |
| RequestContentInfo | · STORAGE AREA ID<br>· CONTENT FORMAT TYPE<br>· OBTAINMENT REQUEST NUMBER | · CONTENT ID<br>· CONTENT FILE NAME<br>· CONTENT FILE SIZE<br>· GENERATED DATE AND TIME OF CONTENT FILE | OBTAIN CONTENT ID AND BASIC INFORMATION OF CONTENT FILE STORED IN STORAGE AREA OF DIGITAL CAMERA |
| RequestContent | · CONTENT ID<br>· CONTENT SIZE | · CONTENT FILE | OBTAIN CONTENT FILE |
| RequestContentDetailInfo | · CONTENT ID | · CONTENT DETAIL INFORMATION | OBTAIN DETAIL INFORMATION OF CONTENT FILE |
| ⋮ | | | |

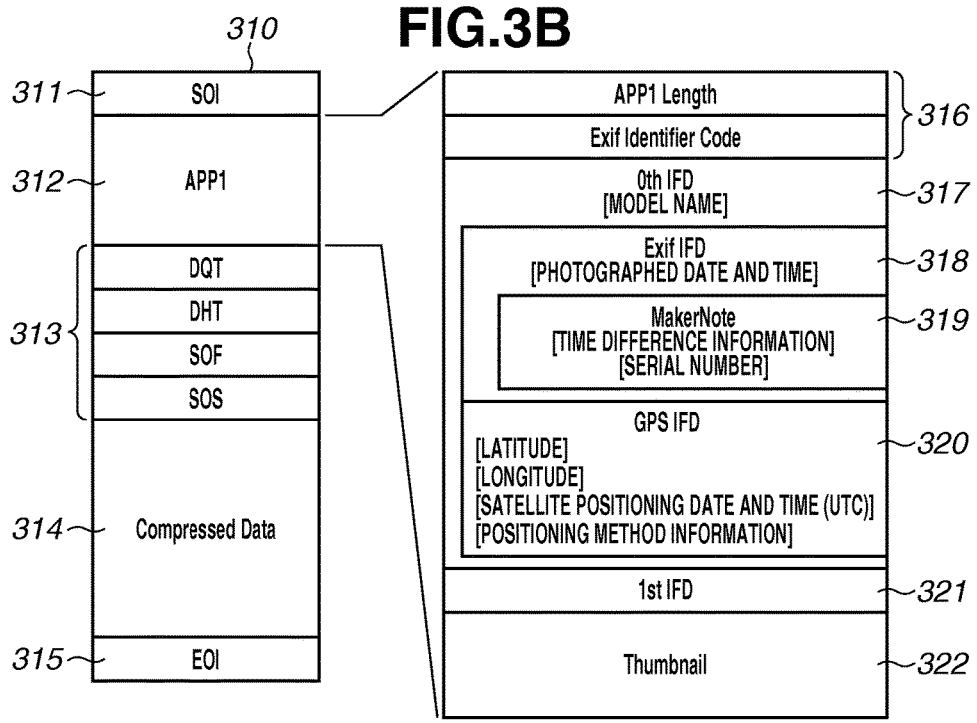

FIG.3B

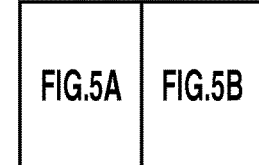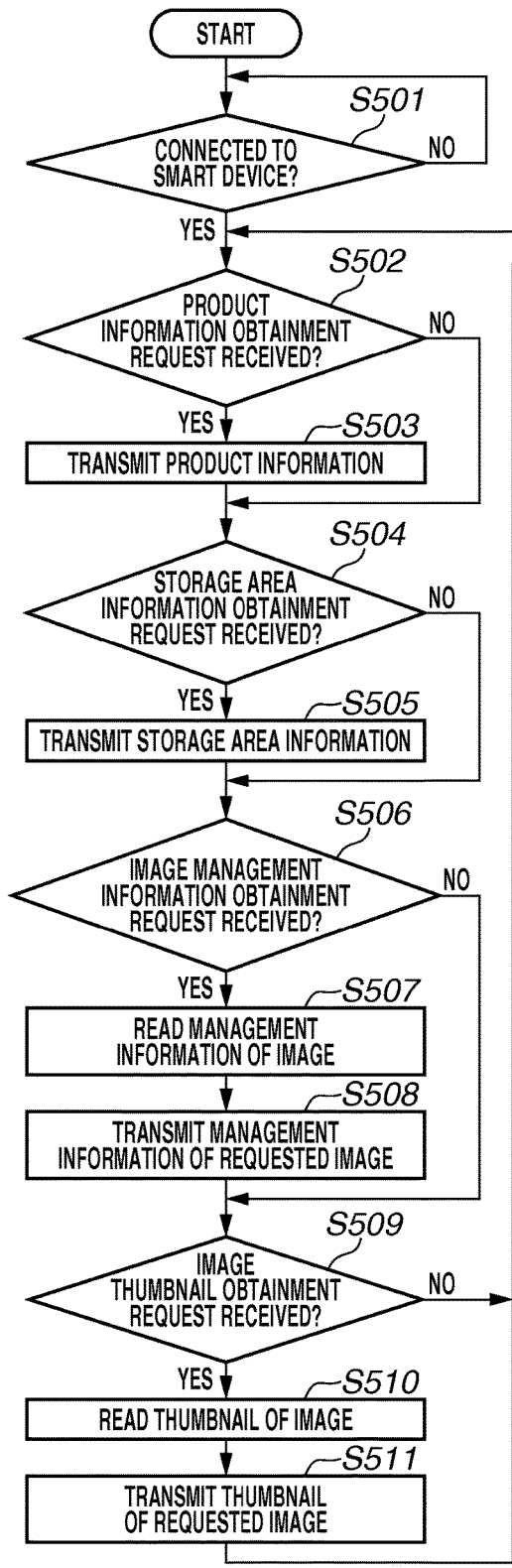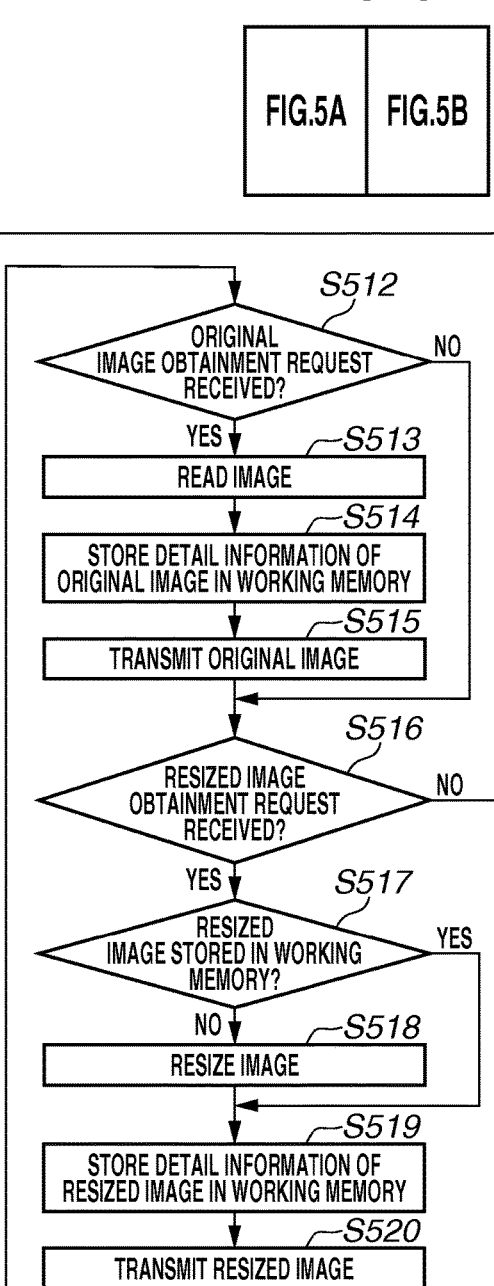

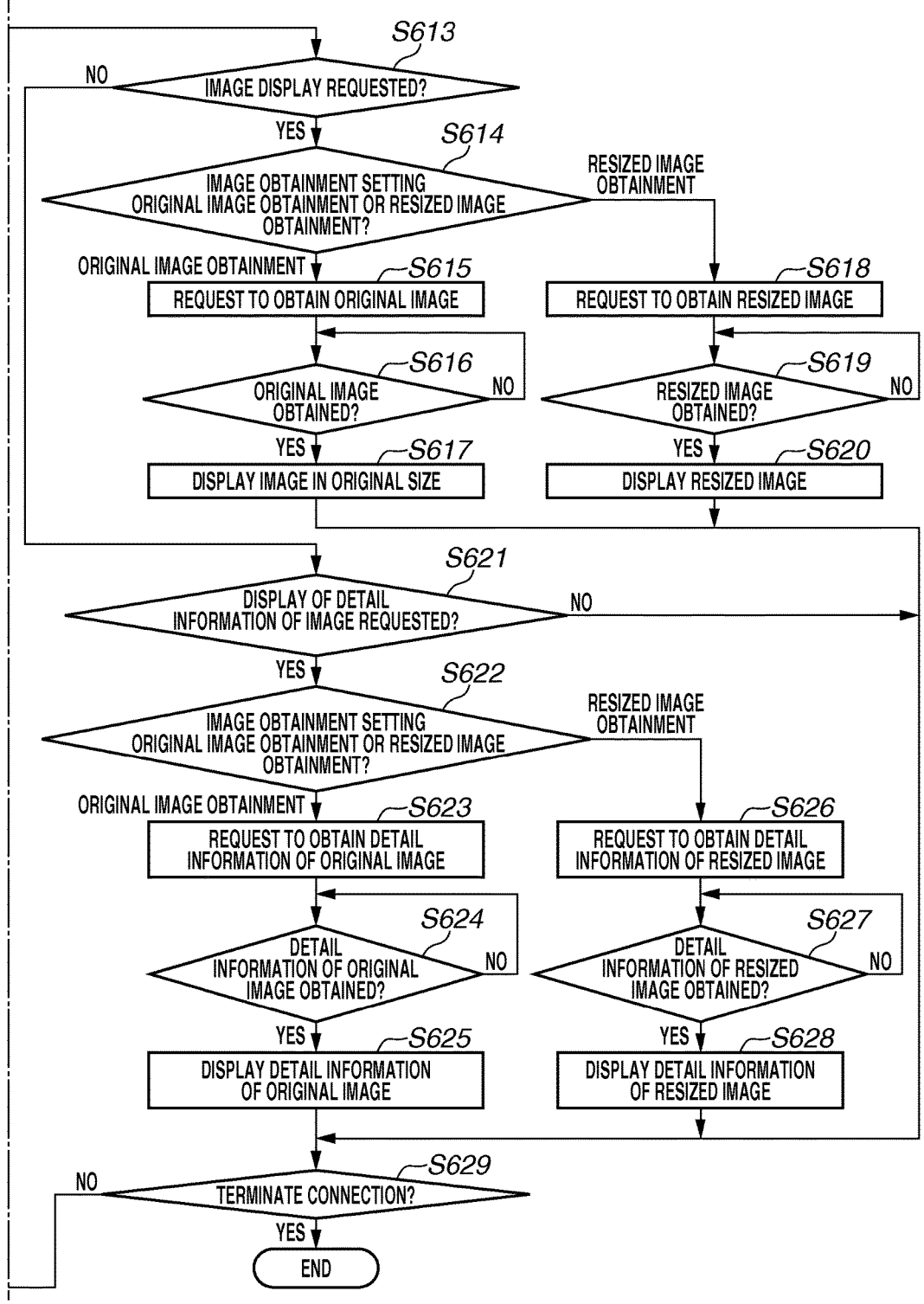

COMMUNICATION APPARATUS COMMUNICABLE WITH EXTERNAL APPARATUS, CONTROL METHOD OF COMMUNICATION APPARATUS, AND STORAGE MEDIUM

BACKGROUND

Field

Aspects of the present invention generally relate to a communication apparatus communicable with an external apparatus.

Description of the Related Art

Recently, a digital camera can be wirelessly connected to a mobile phone, and functions of the digital camera can be used from the mobile phone. For example, Japanese Patent Application Laid-Open No. 2013-162303 discusses a system in which a digital camera is connected to a mobile phone via a wireless local area network (LAN), and images recorded in the digital camera are remotely viewed by operating the mobile phone.

For example, the system discussed in Japanese Patent Application Laid-Open No. 2013-162303 may be possible not only to simply browse images or thumbnails of the images but also to obtain image data from the digital camera and store the image data in the mobile phone. In such a case, it can be thought that the image data is obtained by resizing to a smaller size from a size of the original image data. Further, it can be thought that whether to obtain the image data or not is determined after recognizing metadata of the resized image. However, it takes time to resize an image and generate metadata of the resized image. Therefore, some time lag occurs from when a request is received from the mobile phone to when the digital camera supplies a resized image and metadata of the resized image to the mobile phone, and it may bring a discomfort feeling to a user.

SUMMARY

According to aspects of the present invention, a communication apparatus includes a communication unit configured to communicate with an external apparatus, a connection unit configured to connect to a storage medium in which image data is recorded, and a control unit configured to, in response to receipt of a request for a resized image of the image data from the external apparatus, generate a resized image by reading the image data from the storage medium, control the communication unit to transmit the resized image to the external apparatus, and perform control to generate and temporarily store metadata of the resized image.

Further features of the present disclosure will become apparent from the following description of exemplary embodiments with reference to the attached drawings.

BRIEF DESCRIPTION OF THE DRAWINGS

FIG. 3A is a table describing application programming interfaces (APIs) that the digital camera according to the first exemplary embodiment publishes to an external apparatus. FIG. 3B is a schematic diagram of an image data structure according to the first exemplary embodiment.

DESCRIPTION OF THE EMBODIMENTS

Various exemplary embodiments, features, and aspects of the invention will be described in detail below with reference to the drawings.

It is to be noted that the exemplary embodiment described below is merely one example for implementing aspects of the present invention and can be appropriately modified or changed depending on individual constructions and various conditions of apparatuses to which aspects of the present invention is applied. In addition, each of the exemplary embodiments can be appropriately combined.

<Configuration of Digital Camera 100>

Figure 1A:
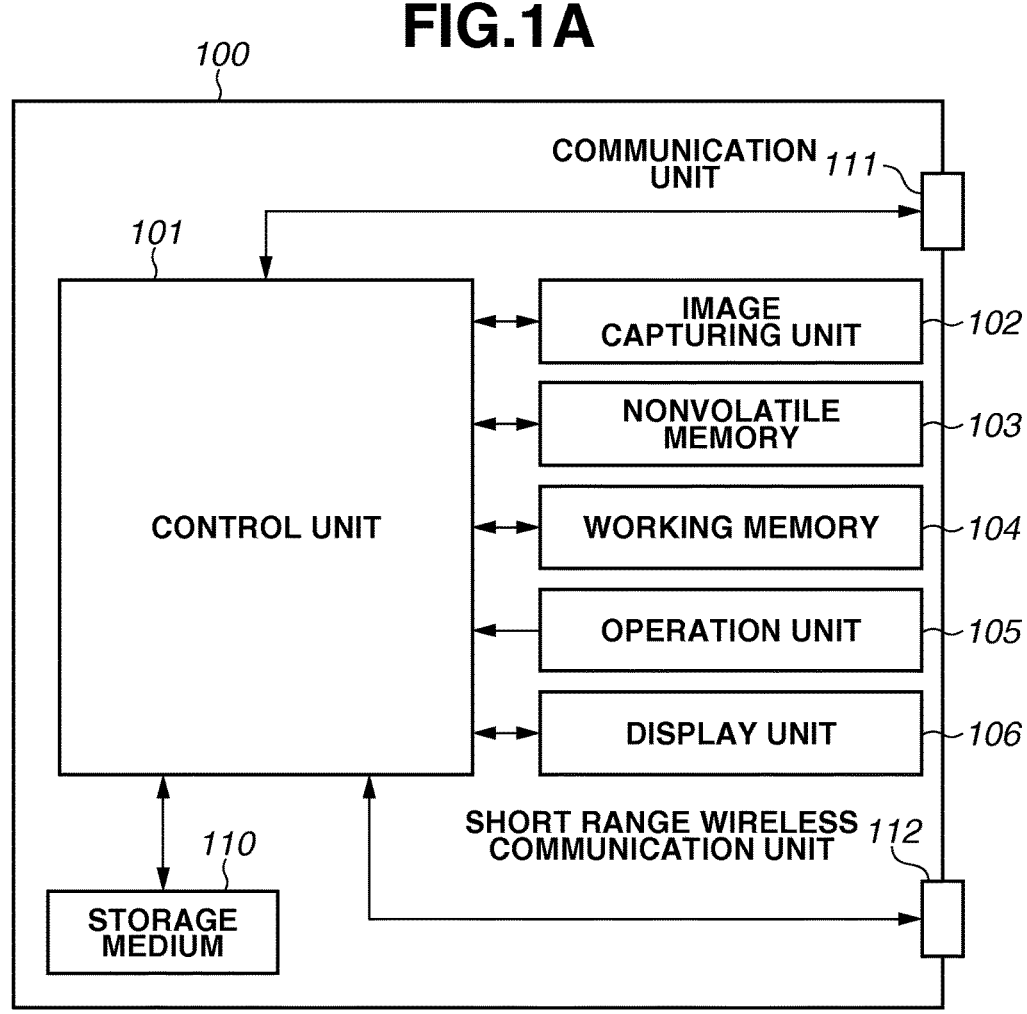
FIG. 1A is a block diagram of a digital camera according to a first exemplary embodiment.

FIG. 1A is a block diagram illustrating a configuration example of a digital camera 100 which is an example of a communication apparatus according to a first exemplary embodiment. The digital camera is described as an example of the communication apparatus, however, the communication apparatus is not limited to the digital camera. For example, the communication apparatus may be an information processing apparatus, such as a portable media player, a tablet device, and a personal computer.

A control unit 101 controls each unit in the digital camera 100 according to an input signal and a program described below. Instead of the control unit 101 to control an entire apparatus, a plurality of hardware pieces may control the entire apparatus by sharing processing.

An image capturing unit 102 is constituted by, for example, an optical system controlling an optical lens unit, a stop, a zoom, and a focus and an image sensor converting light (an image) entered through the optical lens unit into an electrical image signal. As the image sensor, a complementary metal oxide semiconductor (CMOS) and a charge coupled device (CCD) are generally used. The image capturing unit 102 is controlled by the control unit 101, and thus converts object light formed by a lens included in the image capturing unit 102 into an electrical signal by the image sensor and outputs digital data as image data by performing noise reduction processing and the like. The digital camera 100 according to the present exemplary embodiment records image data in a storage medium 110 conforming to the design rule for camera file system (DCF) standards.

A nonvolatile memory 103 is an electrically erasable and recordable nonvolatile memory and stores a below-described program executed by the control unit 101 and the like.

A working memory 104 is used as a buffer memory for temporarily storing image data captured by the image capturing unit 102, an image display memory of a display unit 106, a working area of the control unit 101, and the like.

An operation unit 105 is used to receive an instruction to the digital camera 100 from a user. The operation unit 105 includes, for example, a power button for a user to instruct ON/OFF of a power source of the digital camera 100, a release switch for instructing image capturing, and a playback button for instructing reproduction of image data. In addition, an operation member, such as a dedicated connection button to start communication with an external apparatus via a communication unit 111 described below, is included. A touch panel formed on the display unit 106 described below is included in the operation unit 105. The release switch includes switches SW1 and SW2. When the release switch is brought into a half-pressed state, the switch SW1 turns ON. Accordingly, an instruction to perform preparations of photographing, such as automatic focus (AF) processing, automatic exposure (AE) processing, automatic white balance (AWB) processing, and pre-flash (EF) processing. Further, when the release switch is brought into a full-pressed state, the switch SW2 turns ON. Accordingly, an instruction to perform photographing is received.

The display unit 106 displays a viewfinder image at the time of photographing, captured image data, and a text for an interactive operation. The display unit 106 is not necessarily included in the digital camera 100. The digital camera 100 only needs to be able to connect to an internal or external display unit 106 and include at least a display control function of controlling display of the display unit 106.

The storage medium 110 can record image data output from the image capturing unit 102 as a file. As a system for managing files in the digital camera 100, for example, a file allocation table (FAT) can be adopted. The storage medium 110 may be detachable from the digital camera 100 and built in the digital camera 100. In other words, the digital camera 100 may include at least a means for accessing the storage medium 110.

The communication unit 111 is an interface to connect to the external apparatus. The digital camera 100 according to the present exemplary embodiment can exchange data with the external apparatus via the communication unit 111. For example, image data generated by the image capturing unit 102 can be transmitted to the external apparatus via the communication unit 111. According to the present exemplary embodiment, the communication unit 111 includes an interface for communicating with the external apparatus by a wireless LAN conforming to Institute of Electrical and Electronics Engineers (IEEE) 802.11 standards, and the control unit 101 realizes communication with the external apparatus via the wireless LAN by controlling the communication unit 111. In the communication by the wireless LAN, the control unit 101 may connect to the external apparatus directly or via an access point. As a protocol for communicating data, for example, a HyperText Transfer Protocol (HTTP) can be used. In addition, a picture transfer protocol/Internet protocol (PTP/IP) can be used. A communication method is not limited to the wireless LAN, and a wireless communication method, such as an infrared communication method, a Bluetooth® communication method, and a wireless Universal Serial Bus (USB) can be adopted. Further, a wireline connection using a USB cable, a high-definition multimedia interface (HDMI)®, IEEE 1394, and Ethernet® may be adopted.

A short-range wireless communication unit 112 includes, for example, an antenna for wireless communication and a modulation and demodulation circuit and a communication controller for processing a wireless signal. The short-range wireless communication unit 112 realizes short-range wireless communication by outputting a modulated wireless signal from the antenna and demodulating a wireless signal received by the antenna. Here, the short-range wireless communication conforming to International Organization for Standardization/International Electrotechnical Commission (ISO/IEC) 18092 standards (near field communication (NFC)) is realized. In addition, other short-range wireless communication conforming to wireless communication method, such as the infrared communication method, the Bluetooth® communication method, and the wireless USB can be adopted. When the Bluetooth® communication method is adopted to the short-range wireless communication unit 112, for example, the Bluetooth® Low Energy version 4.0 consuming low power can be adopted. A communicable range of the Bluetooth® communication is small (in other words, a communicable distance is short) as compared with that of the wireless LAN communication. In addition, a communication speed of the Bluetooth® communication is slow as compared with that of the wireless LAN communication. On the other hand, power consumption of the Bluetooth® communication is small as compared with the wireless LAN communication.

The short-range wireless communication unit 112 according to the present exemplary embodiment is disposed on a side of the digital camera 100.

The digital camera 100 according to the present exemplary embodiment is connected to a smart device 200 described below when starting communication from the communication unit 111. The communication unit 111 of the digital camera 100 according to the present exemplary embodiment includes an access point (AP) mode operating as an access point in an infrastructure mode and a client (CL) mode operating as a client in the infrastructure mode. When the communication unit 111 is operated in the CL mode, the digital camera 100 according to the present exemplary embodiment can operate as a client device (hereinbelow, the CL device) in the infrastructure mode. When the digital camera 100 operates as the CL device, the digital camera 100 connects to a peripheral access point device (hereinbelow, the AP device) and can participate in a network formed by the AP device. In addition, when the communication unit 111 is operated in the AP mode, the digital camera 100 according to the present exemplary embodiment can operate as a simple AP (hereinbelow, the simple AP) which is a kind of an AP whose function is more limited. When the digital camera 100 operates as the simple AP, the digital camera 100 forms a network by itself. Peripheral devices of the digital camera 100 recognize the digital camera 100 as the AP device and can participate in the network formed by the digital camera 100. A program for operating the digital camera 100 as described above is stored in the nonvolatile memory 103.

The digital camera 100 according to the present exemplary embodiment is a kind of an access point, however, it is a simple AP which does not include a gateway function of transferring data received from the CL device to an Internet provider or the like. Therefore, when the digital camera 100 receives data from another device participating in the network formed by itself, the digital camera 100 cannot transfer the data to the network such as the Internet.

Figure 1B:
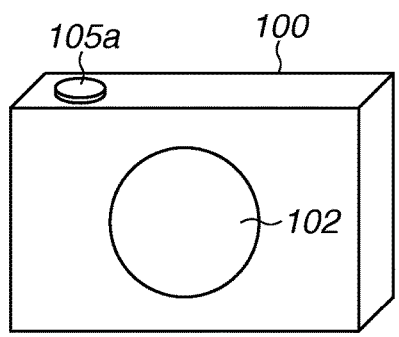
FIGS. 1B and 1C are external appearances of the digital camera according to the first exemplary embodiment.
Figure 1C:
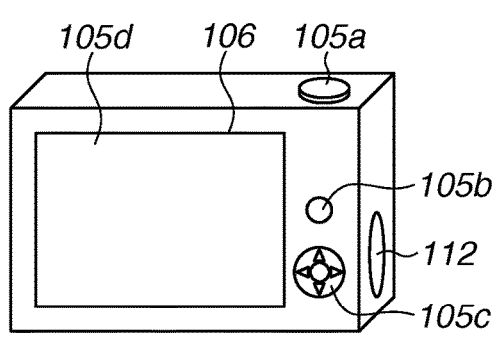

Next, an external appearance of the digital camera 100 is described. FIGS. 1B and 1C are examples of the external appearance of the digital camera 100. A release switch 105a, a playback button 105b, a direction key 105c, and a touch panel 105d are operation members included in the above-described operation unit 105. The display unit 106 displays an image obtained as a result of image capturing by the image capturing unit 102.

Thus, the digital camera 100 has been described above.

<Configuration of Smart Device 200>

Figure 2:
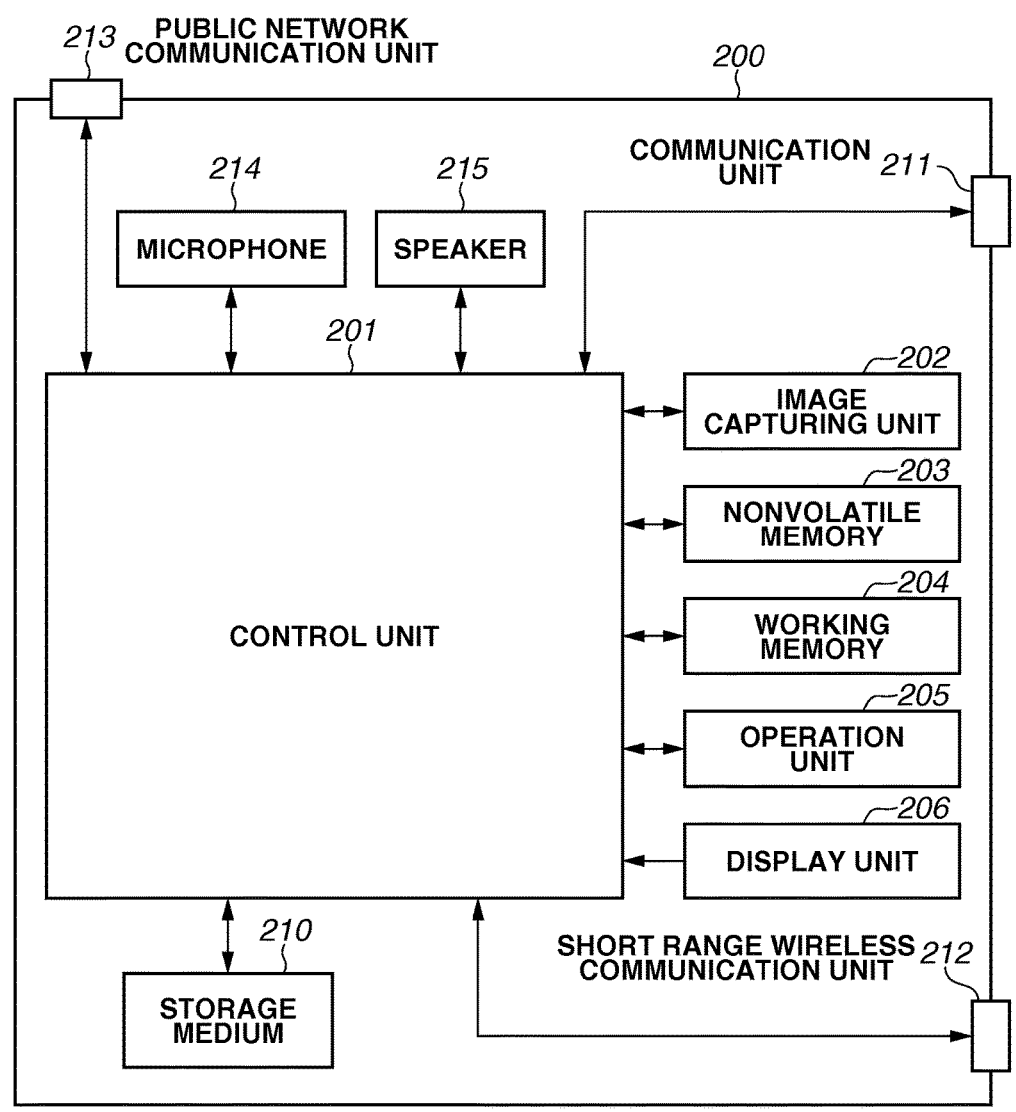
FIG. 2 is a block diagram illustrating a configuration of a smart device according to the first exemplary embodiment.

FIG. 2 is a block diagram illustrating a configuration example of the smart device 200 which is an example of an information processing apparatus according to the present exemplary embodiment. In this regard, a smart device represents a smartphone and a tablet device. The smart device is described as an example of the information processing apparatus here, however, the information processing apparatus is not limited to the smart device. For example, the information processing apparatus may include a digital camera, a printer, a television, or a personal computer with radio function.

A control unit 201 controls each unit in the smart device 200 according to an input signal and a below described program. Instead of the control unit 201 to control an entire apparatus, a plurality of hardware pieces may control the entire apparatus by sharing processing.

An image capturing unit 202 converts object light formed by a lens included in the image capturing unit 202 into an electrical signal, performs noise reduction processing thereon, and outputs digital data as image data. The captured image data is stored in a buffer memory, subjected to a predetermined processing by the control unit 201, and stored in a storage medium 210.

A nonvolatile memory 203 is an electrically erasable and recordable nonvolatile memory. The nonvolatile memory 203 stores an operating system (OS) which is basic software executed by the control unit 201 and an application for realizing an applicable function in cooperation with the OS. In addition, according to the present exemplary embodiment, the nonvolatile memory 203 stores an application for communicating with the digital camera 100.

A working memory 204 is used as an image display memory of a display unit 206, a working area of the control unit 201, and the like.

An operation unit 205 is used to receive an instruction to the smart device 200 from a user. The operation unit 205 includes, for example, a power button for a user to instruct ON/OFF of a power source of the smart device 200 and an operation member, such as a touch panel formed on the display unit 206.

The display unit 206 displays image data and a text for an interactive operation. The display unit 206 is not necessarily included in the smart device 200. The smart device 200 only needs to be able to connect to the display unit 206 and include at least a display control function of controlling display of the display unit 206.

The storage medium 210 can record image data output from the image capturing unit 202. As a system for managing files in the smart device 200, for example, an FAT can be adopted. The storage medium 210 may be detachable from the smart device 200 and built in the smart device 200. In other words, the smart device 200 may include at least a means for accessing the storage medium 210.

A communication unit 211 is an interface to connect to the external apparatus. The smart device 200 according to the present exemplary embodiment can exchange data with the external apparatus via the communication unit 211. For example, image data generated by the image capturing unit 202 can be transmitted to the external apparatus via the communication unit 211. According to the present exemplary embodiment, the communication unit 211 includes an interface for communicating with the external apparatus by the wireless LAN conforming to IEEE 802.11 standards, and the control unit 201 realizes communication with the external apparatus via the wireless LAN by controlling the communication unit 211. In the communication by the wireless LAN, the control unit 201 may connect to the external apparatus directly or via an access point. As a protocol for communicating data, for example, an HTTP and a PTP/IP can be used. The communication method is not limited to the wireless LAN, and a wireless communication method, such as the infrared communication method, the Bluetooth® communication method, and the wireless USB can be adopted. Further, a wireline connection using a USB cable, an HDMI®, IEEE 1394, and Ethernet® may be adopted.

A short-range wireless communication unit 212 includes, for example, an antenna for wireless communication and a modulation and demodulation circuit and a communication controller for processing a wireless signal. The short-range wireless communication unit 212 realizes non-contact short-range communication by outputting a modulated wireless signal from the antenna and demodulating a wireless signal received by the antenna. Here, the short-range wireless communication conforming to ISO/IEC 18092 standards (NFC) is realized. In addition, other short-range wireless communication conforming to wireless communication method, such as the infrared communication method, the Bluetooth® communication method, and the wireless USB can be adopted. When the Bluetooth® communication method is adopted to the short-range wireless communication unit 212, for example, the Bluetooth® Low Energy version 4.0 consuming low power can be adopted. The communicable range of the Bluetooth® communication is small (in other words, the communicable distance is short) as compared with that of the wireless LAN communication. In addition, the communication speed of the Bluetooth® communication is slow as compared with that of the wireless LAN communication. On the other hand, the power consumption of the Bluetooth® communication is small as compared with the wireless LAN communication.

A public network communication unit 213 is an interface used in public wireless communication. The smart device 200 can make a call to another device via the public network communication unit 213. At that time, the control unit 201 inputs and outputs audio signals via a microphone 214 and a speaker 215 to realize a call. In addition, according to the present exemplary embodiment, the public network communication unit 213 can connect to the public network according to the standards such as Wideband Code Division Multiple Access (W-CDMA) (Universal Mobile Telecommunications System (UMTS)) and Long Term Evolution (LTE). A single antenna can be used as both of the communication unit 211 and the public network communication unit 213.

Thus, the smart device 200 has been described above.

<API for Controlling Digital Camera from External Apparatus>

FIG. 3A is a table describing application programming interfaces (APIs) for controlling the digital camera 100 from an external apparatus.

The digital camera 100 according to the present exemplary embodiment publishes APIs controllable from an external apparatus, such as the smart device 200. The APIs are implemented in both OSs installed in the digital camera 100 and the smart device 200. A designer of an application to be loaded an external apparatus can easily implement a desired function without regard to detailed procedures using the published API. For example, an application can realize obtainment of device information recorded in the nonvolatile memory 103 and a content file stored in the storage medium 110 of the digital camera 100 by only calling the API implemented in the OS. A content file is a file generated by the digital camera 100 and stored in the storage medium 110 and the nonvolatile memory 103 and refers to a still image file and a moving image file according to the present exemplary embodiment. In addition to these files, for example, an audio file, a music file, and a markup language file, such as a HyperText Markup Language (HTML) may be supplied to an external apparatus. A still image file is mainly described below as an example for ease of the description.

The digital camera 100 stores in advance an API as a program in the nonvolatile memory 103. When the communication between the digital camera 100 and an external apparatus is established via the communication unit 111, the digital camera 100 develops a program for executing the API in the working memory 104 and waits for a request for the API from the external apparatus. When a request for the API from the external apparatus is detected, the control unit 101 executes processing in response to a type of the API and transmits a processing result as a response to the external apparatus. The API is executed on a communication protocol defined by the digital camera 100, and the external apparatus communicates with the digital camera 100 using the defined communication protocol to request the API. The present exemplary embodiment is described on the assumption that the present API is executed on the HTTP, however, another communication protocol (for example, PTP/IP) may be adopted.

A method for executing the API on the HTTP is basically realized by following procedures. In other words, the external apparatus describes an API name and a necessary argument in a text in an HTTP request body and transmits the HTTP request to the digital camera 100 using a GET method or a POST method to request execution of the API. In response to the request, the digital camera 100 adds a result to an HTTP response body and transmits the HTTP response to the external apparatus as a response to supply an execution result of the API. In the following descriptions, to execute processing for transmitting a request using the API is also described as to call the API.

An API list 300 in FIG. 3A is a table of types and descriptions of the APIs provided by the digital camera 100 operating using the above-described mechanism. The APIs described below are merely examples, and APIs other than below described ones may be used as APIs for controlling the digital camera 100.

An API 301 is used for obtaining product information of the digital camera 100. When a request for an API name "RequestProductInfo" is made to the digital camera 100 without an argument, a product name, a manufacturer name, a firmware version, and a serial number of the digital camera 100 can be obtained from the digital camera 100 as a response. The product name is a name of the product of the digital camera 100. The manufacturer name is a name of the manufacturer of the digital camera 100. The firmware version is a version number of a program for controlling the digital camera 100 stored in the nonvolatile memory 103. The serial number is a unique number enabling individual identification of the digital camera 100.

An API 302 is used for obtaining information about a storage area of the digital camera 100. When a request for an API name "RequestMemoryInfo" is made to the digital camera 100, a storage area identification (ID), a storable capacity, a free capacity, the number of stored content files of the digital camera 100 can be obtained from the digital camera 100 as a response. The request is made without an argument. The storage area ID is an identification (ID) assigned to each area which can store a content file generated by the digital camera 100. The area which can store a content file is, for example, the storage medium 110 of the digital camera 100, and an ID is assigned to the storage medium 110. When the digital camera 100 can insert a plurality of storage media therein, different IDs are assigned to the individual storage media. The storable capacity is an upper limit size of the storage area which can store content files. The free capacity is a size of an area in which a content file is not stored in the storage area. The number of stored content files is a total number of content files stored in the storage area.

An API 303 is used for obtaining management information of a content ID and a content file stored in the storage area of the digital camera 100. The management information is recorded in a management area (an area referred to as a directory entry secured in each directory) for managing a file in a directory and information of the directory in which a content recorded. When a request for an API name "RequestContentInfo" is made by specifying the storage area ID obtained by the API 302, a content format type, and the number of obtainment requests, following information pieces can be obtained from the digital camera 100 as a response. Specifically, a content ID, a file name, a file size, generated date and time of file, and others of a content file stored in the storage area of the digital camera 100 are obtained. The content ID is an ID automatically assigned by the control unit 101 of the digital camera 100 to individually identify a content file. In this regard, separately from an ID for managing a file in the digital camera 100, an ID temporarily used in communication with the smart device 200 using the API 303 may be assigned and used as the content ID.

An API 304 is used for obtaining a content file stored in the storage area of the digital camera 100. When a request for an API name "RequestConent" is made by specifying a content ID and a type of a content size, a content file can be obtained from the digital camera 100 as a response. As a type of a content size, for example, an original size, a reduced size, or the like can be specified. Accordingly, the digital camera 100 generates a content file according to the specified size and transmits the content file to the external apparatus as a response. According to the present exemplary embodiment, as the type of the content size, for example, whether to obtain a still image file in an original size or in a thumbnail size can be specified. When the original size is specified, image data recorded in the digital camera 100 is obtained. When the thumbnail size is specified, a thumbnail recorded in a header of image data recorded in the digital camera 100 is obtained. In a case where the digital camera 100 has, for example, a function of resizing an image, and if "resizing" is specified as an argument, and a size is further specified, the digital camera 100 transmits an image by reducing to a specified size. When a size is not specified, an image may be resized to a predetermined size. A specific example of resizing is processing for reducing a size of still image data by thinning pixels. In the following descriptions, the digital camera 100 is described as having a resizing function.

An API 305 is used for obtaining detail information (metadata) of a content file stored in the storage area of the digital camera 100. When a request for an API name "RequestContentDetailInfo" is made by specifying the content ID as an argument, detail information of the content corresponding to the specified content ID can be obtained. When the API 305 is used, the detail information of the content is obtained without receiving the content itself. Similar to the API 304, an argument for specifying a type of the content size can be used. Further, similar to the API 304, for example, an original size and a reduced size can be specified as a type of the content size. Furthermore, when the digital camera 100 has, for example, a function of resizing an image, "resizing" can be specified as an argument. When resizing is specified, the digital camera 100 transmits not the detail information of the image data but the detail information of the resized image data.

According to the present exemplary embodiment, the detail information is metadata which is, for example, exchangeable image file format (Exif) information of a still image file. Exif is a format of image metadata for a digital camera developed by Japan Electronics and Information Technology Industries Association (JEITA). The Exif information is recorded in a header of image data, and it is necessary to read and analyze the header of the image data to recognize contents thereof. When the API 305 is implemented, the digital camera can analyze the header of the image and obtain the metadata in a format which can be interpreted by the smart device 200, so that the smart device 200 does not need to analyze Exif of the image. In other words, for example, if the smart device 200 does not have a function of analyzing Exif of image data received using the API 304, the smart device 200 can obtain metadata by obtaining the metadata from the digital camera 100. Analysis of the header of the image data takes some time. Thus, as compared with the management information recorded in the directory entry, it takes longer time to be transmitted as data.

A configuration of image data according to the present exemplary embodiment is described below. FIG. 3B is a schematic diagram of a configuration of image data according to the present exemplary embodiment. The image data is, for example, generated by the digital camera 100 and recorded in a data recording area of the storage medium 110.

For a data structure of an image file according to the present exemplary embodiment, Exif-Joint Photographic Experts Group (JPEG) is used for an image file format, however, a format having a data structure in which metadata can be recorded in an image file may be used, such as Exif-Tagged Image File Format (TIFF) format, a RAW image, and a moving image.

In Exif-JPEG 310 in FIG. 3B, a SOI 311 is a marker indicating a start of the Exif-JPEG 310. An APP1 312 is an application marker corresponding to a header portion of the Exif-JPEG 310. A data block 313 includes a quantization table (DQT), a Huffman table (DHT), a start of frame marker (SOF), a start of scan marker (SOS). Compressed Data 314 is compressed data of an original image. An EOI 315 is a marker indicating an end of the Exif-JPEG 310.

The APP1 312 includes data blocks 316 to 322 in FIG. 3B. The data block 316 includes an APP1 Length indicating a size of the APP1 312 and an Exif Identifier Code indicating an identification code of the APP1 312. A 0th IFD 317 is the data block for recording ancillary information about the compressed original image. For example, the 0th IFD 317 includes information of a model name of the digital camera which captured the image. The data blocks of an Exif IFD 318 and a GPS IFD 320 are included in a part of the 0th IFD 317.

The Exif IFD 318 includes a tag regarding an Exif version, a tag regarding a characteristic and a structure of image data, a tag regarding a photographed date and time, a tag regarding photographed conditions in which a shutter speed and a lens focal distance are recorded, and other tags. Further, the Exif IFD 318 includes the data block of a MakerNote 319. In the MakerNote 319, information specific to a manufacturer which generated the file is recorded. Information pieces, such as time difference information and a serial number indicating a unique number of the digital camera 100 used in photographing are included. For the information included in the MakerNote 319, different specification is adopted by each manufacturer. Therefore, unless the specification of a data format recorded in the MakerNote 319 is not published, it is difficult to recognize information recorded in the MakerNote 319 from products and applications of other manufacturers. The API 305 can be used to solve such an issue. In other words, if the API 305 is used, the digital camera 100 can also analyze the MakerNote 319, and the smart device 200 can obtain data in a recognizable format. Therefore, if the apparatus and applications of an API using side do not have a function of analyzing the MakerNote 319, contents of the information recorded in the MakerNote 319 can be recognized.

The GPS IFD 320 includes a tag regarding GPS information. In the GPS information, position information, such as a latitude and a longitude, and satellite positioning date and time (Coordinated Universal Time (UTC)) used in the present exemplary embodiment are recorded.

A 1st IFD 321 is the data block recording ancillary information regarding a thumbnail image. A Thumbnail 322 is image data of a thumbnail.

Thus, the image data structure according to the present exemplary embodiment has been described.

<System Sequence>

Next, procedures for browsing image data are described which are realized by the digital camera 100 and the smart device 200 according to the present exemplary embodiment in cooperation with each other.

Figures 4, 4A, 4B:
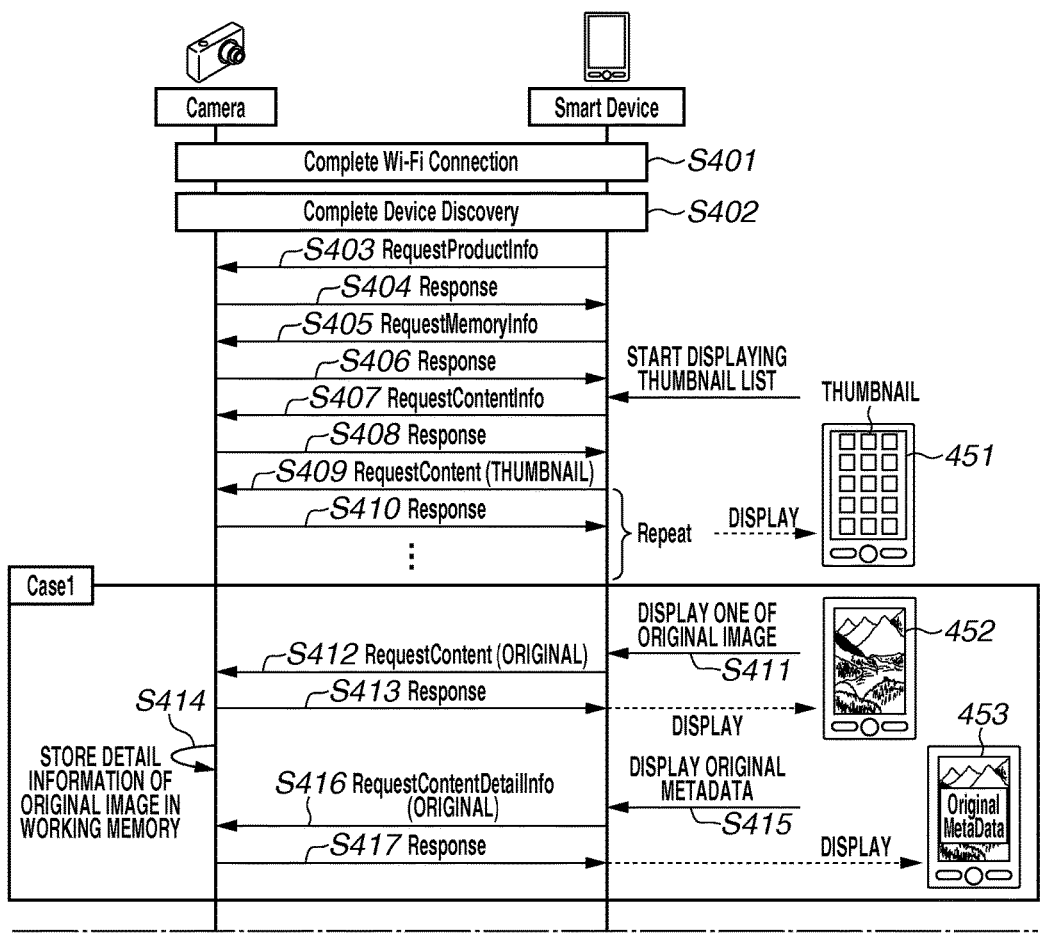
FIG. 4 (including FIGS. 4A and 4B) is a sequence diagram of a system according to the first exemplary embodiment.
Figure 4B:
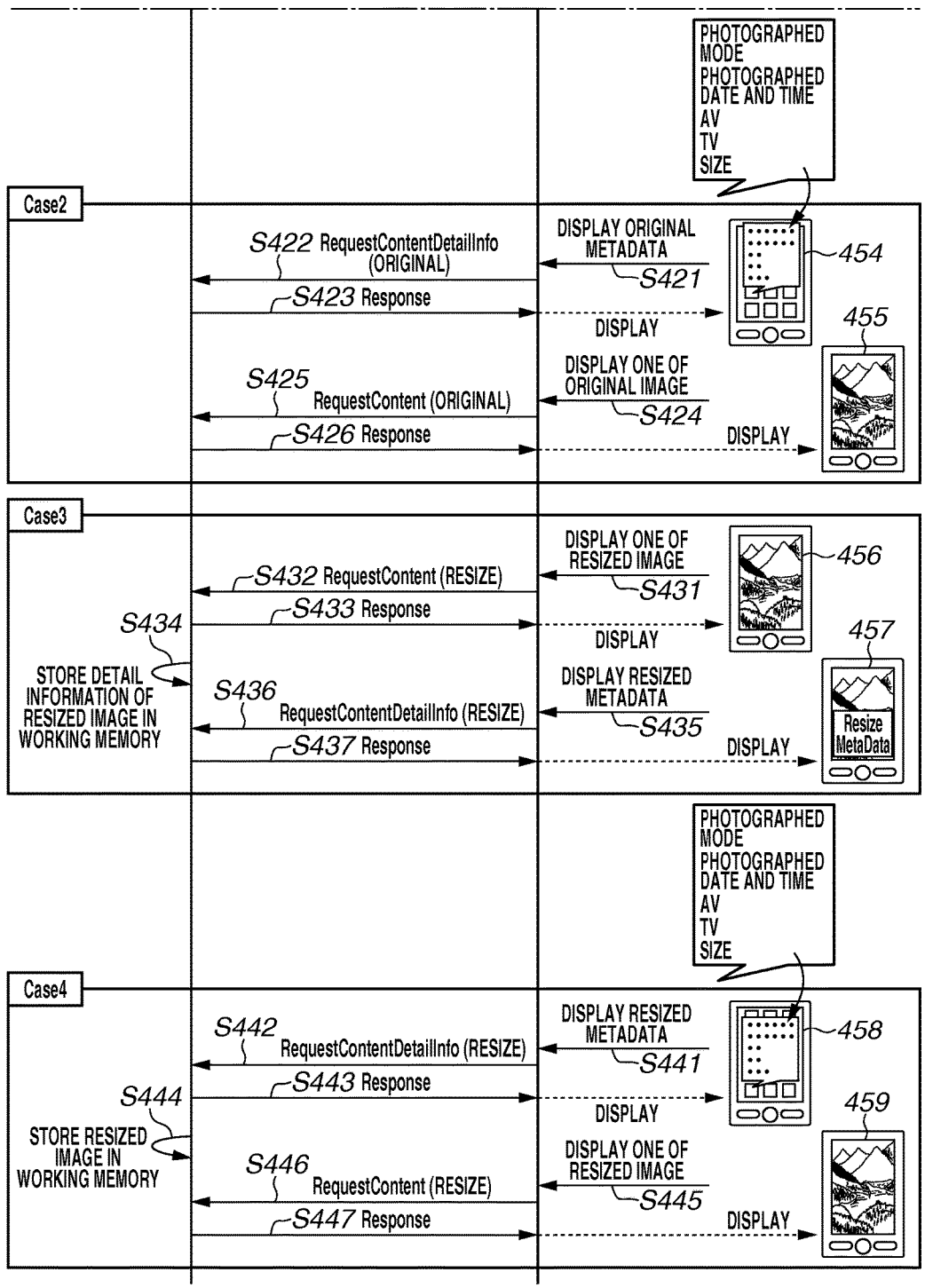

FIG. 4 (including FIGS. 4A and 4B) is a sequence diagram illustrating procedures for browsing data realized by the digital camera 100 and the smart device 200 according to the present exemplary embodiment in cooperation with each other.

First, in step S401, the digital camera 100 and the smart device 200 share a communication parameter with each other and participate in the same network. The network in which the both devices participate may be a network generated by an access point which is a device different from the both devices or a network generated by one of the both devices by operating as a simple AP. According to the present exemplary embodiment, a case is described as example when the digital camera 100 operates as the simple AP and forms a wireless LAN network. When operating as the simple AP, the digital camera 100 starts to periodically transmit a beacon signal. On the other hand, when a start of connection is instructed by a menu operation from the smart device 200, the smart device 200 detects a beacon signal and participates in the wireless LAN network formed by the digital camera 100. Sharing of the communication parameter is realized by a user operating each device (for example, selection of a service set identifier (SSID) on the smart device 200 and a menu operation for instructing start-up of a wireless LAN function on the digital camera 100). Alternatively, the communication parameter may be shared by transmitting the SSID or a password from the digital camera 100 to the smart device 200 through the short-range wireless communication. In this case, the digital camera 100 is configured to automatically start the wireless LAN function in response to sharing of the SSID and the password by the short-range wireless communication.

Next, in step S402, the digital camera 100 and the smart device 200 find each other device by a device finding protocol and perform protocol connection for data communication, so that connection between the both devices are completed. For finding each other device, a protocol, such as a Universal Plug and Play (UPnP) and a Multicast Domain Name Service (mDNS) is used. In addition, as a protocol for the data communication, for example, PTP/IP can be adopted.

Next, in step S403, the smart device 200 calls a RequestProductInfo API for obtaining the product information to the digital camera 100. In other words, the smart device 200 requests the product information from the digital camera 100.

In response to the request, in step S404, the digital camera 100 executes processing corresponding to the RequestProductInfo shown in FIG. 3A and transmits a result to the smart device 200. The digital camera 100 reads the product name, the manufacturer name, the firmware version, the serial number, and the like recorded in the nonvolatile memory 103 in response to reception of the request and transmits them to the smart device 200 as the product information.

In step S405, the smart device 200 calls a RequestMemoryInfo API for obtaining the storage area information to the digital camera 100. In other words, the smart device 200 requests the storage area information from the digital camera 100.

In response to the request, in step S406, the digital camera 100 executes processing corresponding to the RequestMemoryInfo shown in FIG. 3A and transmits a result to the smart device 200. More specifically, the digital camera 100 transmits the storage area ID, the storable capacity, the free capacity, the number of stored contents, and the like to the smart device 200 as the storage area information.

Next, in step S407, the smart device 200 calls a RequestContentInfo API for obtaining management information of an image stored in the digital camera 100 to display a thumbnail list. In other words, the smart device 200 requests the management information of the stored image from the digital camera 100. In the call of the RequestContentInfo API in step S407, the storage area information obtained in step S406 is used as an argument. Further, the processing in step S407 may be automatically executed in response to completion of the processing in step S406 or executed in response to, for example, reception of an instruction to display the thumbnail list by a user operation. FIG. 4 illustrates a case in which the processing is executed in response to an instruction from a user as an example.

Next, in regard to the request, in step S408, the digital camera 100 executes processing corresponding to the RequestContentInfo shown in FIG. 3A and transmits a result to the smart device 200. More specifically, the digital camera 100 reads the content ID, a content file name, a content file size, and generated date and time of content from the directory entry of the directory in which the image is stored and transmits them to the smart device 200.

The processing in step S407 and step S408 is repeated for the number of the thumbnails displayed on the display unit 206 of the smart device 200. FIG. 4 illustrates a case in which fifteen thumbnails obtained by below described steps are displayed in a screen as an example. In this case, the processing in step S407 and step S408 is repeated fifteen times, and the management information pieces of the images corresponding to the thumbnails displayed on the screen are obtained. In this regard, a plurality of management information pieces may be obtained in one call of the RequestContentInfo API. In this case, a range of the management information pieces to be obtained is specified as the argument of the RequestContentInfo API. More specifically, it is specified as an obtaining target range 1 to 15. When the range is specified as described above, fifteen pieces of the management information from management information of a first image to management information of a fifteenth image are returned as a response among the management information pieces of the images managed in the digital camera 100 in a predetermined order. For example, the management information pieces are returned in a generated order of the images.

Next, in step S409, the smart device 200 calls a RequestContent API for obtaining a thumbnail to be displayed based on the management information of the image received from the digital camera 100 in step S408. In other words, the smart device 200 requests the thumbnail of the image from the digital camera 100 using an ID of the image of which image information is obtained as an argument.

In response to the request, in step S410, the digital camera 100 executes processing corresponding to the RequestContent shown in FIG. 3A and transmits thumbnail data to the smart device 200. In other words, the digital camera 100 analyzes the header of the image determined based on the image ID included in the argument of the called API to read the thumbnail data and transmits the thumbnail data to the smart device 200.

The processing in step S409 and step S410 is repeated until all thumbnails to be displayed are obtained. The thumbnails obtained by the processing in step S409 and step S410 are successively displayed on the display unit 206 of the smart device 200 without waiting completion of repetition. Accordingly, for example, a thumbnail list as in a screen 451 is displayed on the display unit 206 of the smart device 200.

Management information and a thumbnail regarding an image other than the images corresponding to the thumbnails displayed on the screen 451 may be obtained afresh by executing the processing in step S407 to step S410 when a display instruction of other thumbnails is input. In a thumbnail list screen, an instruction to browse other thumbnails can be input by, for example, a touch operation on a touch panel. Regarding update of the thumbnail list, the screen is updated by a display mode in a manner that, for example, thumbnails currently displayed are scrolled out upward by an upward drag operation and a upward flick operation, and a next thumbnail group is newly scrolled in. At that time, management information and thumbnails of the next thumbnail group are obtained by the processing in step S407 to step S410.

In a state in which the thumbnail list is displayed, a user can select any of thumbnails via the operation unit 205 and check a preview and metadata of the original image. In the following description, an operation when a touch panel is adopted as the operation unit 205 is described as an example.

First, a case is considered when an image to be obtained to the smart device 200 is selected in a state in which the thumbnail list is displayed. As described with reference to FIG. 3A, the digital camera 100 according to the present exemplary embodiment has the resizing function. In other words, the digital camera 100 can shorten a time required for transmission of the image data by reducing (hereinbelow, resizing) an image capacity by changing a size of the image. In addition, since a recordable data amount of a mobile device, such as the smart device 200, is small as compared with that of a hard disk drive (HDD) of a desktop personal computer or the like, there is a need to store data by reducing a data size.

The screen of the smart device 200 generally cannot effectively use all of obtained pixels of an image captured by the digital camera 100. It is because the number of pixels obtained from an image captured by the digital camera 100 is generally large as compared with resolution of the display unit 206 of the smart device 200. According to the above-described reason, it can be thought that a user determines that a resized image is desirable data size of which is reduced by thinning pixels of the image to the number of pixels sufficient for an image stored in the smart device 200.

Therefore, the smart device 200 according to the present exemplary embodiment can set in advance whether to obtain an image in an original size or by resizing when an image is obtained from the digital camera 100. For example, a button is displayed for displaying a menu on an upper part or a lower part of the thumbnail list displayed on the display unit 206 of the smart device 200, and when a user of the smart device 200 selects the button, a menu for setting a size when an image is obtained is displayed. The user can set the size of the image to be obtained by selecting a desired data size while considering the above-described data amount and the like.

In addition, when an image is obtained, two cases can be assumed. One is that a user determines an image to be obtained by viewing a thumbnail content, and the other is that a user determines an image to be obtained by conforming a metadata content. Further, for example, if the metadata is confirmed to check a data amount when the data is obtained, two cases can be assumed, one is to confirm the metadata of the original image, and the other is to confirm the metadata of a resized image.

Thus, following four cases can be assumed for procedures for a user to determine an image to obtain to the smart device 200 from a state in which the thumbnail list as in the screen 451 is displayed on the display unit 206 of the smart device 200.

In other words, it can be assumed a case in which an original image is requested before a request for metadata of the original image (case 1) and a case in which the metadata of the original image is requested before a request for the original image (case 2). Further, it can be assumed a case in which a resized image is requested before a request for metadata of the resized image (case 3) and a case in which the metadata of the resized image is requested before a request for the resized image (case 4).

Each of the four cases is described below.

Case 1: An original image is requested before a request for metadata of the original image.

In the case 1, first, in step S411, the smart device 200 receives an instruction from a user to perform preview display of a desired image from the thumbnail list. For example, a user can input an instruction to obtain an image corresponding to a thumbnail by touching a display area of the thumbnail with two fingers. The touch operation with two fingers is an example, and another operation may be adopted as long as the operation can be distinguished from operations assigned to other processing. It is assumed that the smart device 200 is set, before input of the instruction, to obtain an image in an original size when obtaining an image.

In step S412, the smart device 200 which received the instruction to perform preview display of the image calls the RequestContent API using image ID of an image corresponding to the instructed thumbnail as an argument. A value indicating "original" is used as an argument of an image size.

In response to the request, in step S413, the digital camera 100 executes processing corresponding to the RequestContent shown in FIG. 3A and transmits the image data to the smart device 200. In other words, the digital camera 100 transmits the image data corresponding to the image ID included in the request to the smart device 200. In addition to the transmission, the digital camera 100 executes processing in step S414.

In step S414, the digital camera 100 analyzes and reads a header area of the image data corresponding to the image ID included in the request received from the smart device 200 and stores the metadata in the working memory 104. Accordingly, if a user requests detail information later, the digital camera 100 can handle the request smoothly.

On the other hand, the smart device 200 which received the image data performs preview display of the selected image on the display based on the image data received from the digital camera 100. Accordingly, for example, a single image is displayed in a screen as illustrated in a screen 452 on the display unit 206 of the smart device 200. The display of the image on the screen is just preview display. In other words, the image being displayed is temporarily stored in the working memory 104 and not yet stored in the storage medium 210 of the smart device 200. Thus, when display is returned to the thumbnail list and other images are viewed, the image being displayed is erased from the working memory 104. An instruction to store the image in the storage medium 210 is received, for example, by displaying a storage button. When the instruction is received, the image in the preview display stored in the working memory 104 is stored in the storage medium 210. The same thing is applied to preview display described below.

In addition, when a user touches on the display area of the image data in the preview display for a predetermined time length or more on the screen (referred to as long press), the user can input an instruction to display detail information of the image corresponding to the image data in the preview display. A long press operation is an example, and another operation may be adopted as long as the operation can be distinguished from the above-described instruction for the preview display. For example, operations, such as tap and double tap (an operation performing tap twice within a predetermined time length) may be adopted.

In step S415, the smart device 200 receives an instruction to display the detail information of the image in the preview display from a user.

In step S416, the smart device 200 which received the instruction calls a RequestContentDetailInfo API for obtaining the detail information of the image in the preview display. In other words, the smart device 200 requests the detail information of the image identified by the image ID from the digital camera 100 using the image ID corresponding to the image in the preview display as an argument.

In response to the request, in step S417, the digital camera 100 executes processing corresponding to the RequestContentDetailInfo shown in FIG. 3A and transmits the detail information of the image to the smart device 200. Since the detail information is already stored in step S414, the digital camera 100 can transmit the detail information to the smart device 200 without analyzing the header again. Then, the smart device 200 displays the detail information of the image in the preview display based on the detail information of the image received from the digital camera 100. Information to be displayed includes, for example, a photographed mode, photographed date and time, an Av value, a Tv value, an ISO value, a data size, and the like. Accordingly, for example, the metadata is displayed by overlapping with the image in the preview display as in a screen 453 on the display unit 206 of the smart device 200. The processing in step S416 and step S417 is automatically executed on a background after receiving the instruction in step S415. Therefore, a user can confirm the metadata of the image in the digital camera 100 with a similar operation feeling as if confirming metadata of the image which is already received.

A call of the RequestContentDetailInfo API and a response to the call described below are all similarly executed in the background.

Thus, the case 1 has been described above.

Case 2: Metadata of an original image is requested before a request for the original image.

In the case 2, first, in step S421, the smart device 200 receives an instruction from a user to display detail information of an image corresponding any of thumbnails. For example, a user can input the instruction to display the detail information of the image corresponding the thumbnail by touching the display area of the thumbnail for a predetermined time length or more (referred to as long press). A long press operation is an example, and another operation may be adopted. For example, operations, such as tap, double tap (an operation performing tap twice within a predetermined time length), and tap with two fingers on the thumbnail may be adopted. According to the present exemplary embodiment, the instruction to display the detail information of the image corresponding to the desired thumbnail can be input by the same operation that of when inputting the instruction to display the detail information of the image in the preview display in step S415 of the case 1. It is assumed that the smart device 200 is set, before input of the instruction, to obtain an image in an original size when obtaining an image.

When the instruction to display the detail information of the image corresponding to any of thumbnails is received from the user, in step S422, the smart device 200 calls the RequestContentDetailInfo API for obtaining the detail information of the selected image. In other words, the smart device 200 requests the detail information of the image identified by the image ID from the digital camera 100 using the image ID corresponding to the thumbnail selected by the user in step S421 as an argument.

In response to the request, in step S423, the digital camera 100 executes processing corresponding to the RequestContentDetailInfo shown in FIG. 3A and transmits the detail information of the image to the smart device 200. Then, the smart device 200 displays the detail information of the selected image based on the detail information of the image received from the digital camera 100. Accordingly, for example, the metadata of the original image is displayed by overlapping with the thumbnail list as in a screen 454 on the display unit 206 of the smart device 200.

If an instruction to display detail information of a different thumbnail is further input in this state, the processing in step S422 and step S423 is repeated to obtain the detail information of the image corresponding to the thumbnail and the detail information is displayed. In accordance with the processing, the detail information already displayed is turned into non-display. It is because displaying detail information pieces on a plurality of thumbnails makes the thumbnails difficult to view. In the same manner, display of the detail information may be an obstacle to select a thumbnail in subsequent steps, so that the display of the detail information can be released by, for example, touching an area other than the display area of the detail information.

Next, in step S424, the smart device 200 receives an instruction to perform preview display of any image among the thumbnails displayed on the screen 454. For example, a user can select a desired image based on information, such as contents of the displayed thumbnails and metadata confirmable by the processing in step S421 to step S423, and instruct confirmation of contents of the image in a larger size. For the input of the instruction, for example, a double tap operation on a thumbnail can be adopted. For this operation, another operation may be adopted as long as the operation can be distinguished from the instruction to obtain the detail information in step S421.

In step S425, the smart device 200 which received the instruction to perform preview display of the image calls the RequestContent API using the ID of the specified image as an argument. The value indicating "original" is used as the argument of the image size.

In response to the request, in step S426, the digital camera 100 executes processing corresponding to the RequestContent shown in FIG. 3A and transmits the image data to the smart device 200. In other words, the digital camera 100 transmits the image data corresponding to the image ID included in the request to the smart device 200.

The smart device 200 received the image data performs preview display of the selected image on the display based on the image data received from the digital camera 100. Accordingly, for example, a single image is displayed in a screen as illustrated in a screen 455 on the display unit 206 of the smart device 200.

Thus, the case 2 has been described above.

Case 3: A resized image is requested before a request for metadata of the resized image.

In the case 3, first, in step S431, the smart device 200 receives an instruction from a user to perform preview display of a desired image from the thumbnail list. For example, a user can input an instruction to obtain an image corresponding to a thumbnail by touching a display area of the thumbnail with two fingers. The touch operation with two fingers is an example, and another operation may be adopted as long as the operation can be distinguished from operations assigned to other processing. It is assumed that the smart device 200 is set, before input of the instruction, to obtain an image in a size which is resized when obtaining an image.

In step S432, the smart device 200 which received the instruction to perform preview display of the image calls the RequestContent API using the ID of the specified image as an argument. A value indicating "resizing" is used as an argument of an image size.

In response to the request, in step S433, the digital camera 100 executes processing corresponding to the RequestContent shown in FIG. 3A and transmits the image data to the smart device 200. In other words, the digital camera 100 resizes the image data corresponding to the image ID included in the request and transmits the image data to the smart device 200. In addition to the transmission, the digital camera 100 executes processing in step S434.

In step S434, the digital camera 100 generates detail information of resized image data corresponding to the image ID included in the request received from the smart device 200 and stores the detail information in the working memory 104. Accordingly, if a user requests detail information of the resized image later, the digital camera 100 can handle the request smoothly.

On the other hand, the smart device 200 which received the image data performs preview display of the selected image on the display based on the image data received from the digital camera 100. Accordingly, for example, a single resized image is displayed in a screen as illustrated in a screen 456 on the display unit 206 of the smart device 200.

When a user touches on the display area of the image data in the preview display for a predetermined time length or more on the screen (referred to as long press), the user can input an instruction to display detail information of the image corresponding to the image data in the preview display. A long press operation is an example, and another operation may be adopted as long as the operation can be distinguished from the above-described instruction for the preview display. For example, operations, such as tap and double tap (an operation performing tap twice within a predetermined time length) may be adopted.

In step S435, when an instruction to display the detail information of the resized image is received from a user, in step S436, the smart device 200 calls the RequestContentDetailInfo API. In other words, the smart device 200 transmits to the digital camera 100 a request to obtain the detail information of the image in the preview display. Here, the smart device 200 requests the detail information of the image identified by the image ID from the digital camera 100 using the image ID corresponding to the image in the preview display as an argument. The value indicating "resizing" is used as the argument of the image size.

In response to the request, in step S437, the digital camera 100 executes processing corresponding to the RequestContentDetailInfo shown in FIG. 3A and transmits the detail information of the resized image data to the smart device 200. Since the detail information of the resized image is already stored in step S434, the digital camera 100 can transmit the detail information to the smart device 200 without executing resizing processing and generation processing of the detail information of the resized image again. Then, the smart device 200 displays the detail information of the image in the preview display based on the detail information of the resized image received from the digital camera 100. Accordingly, for example, metadata of the resized image is displayed by overlapping with the image in the preview display as in a screen 457 on the display unit 206 of the smart device 200.

Thus, the case 3 has been described above.

Case 4: Metadata of a resized image is requested before a request for the resized image.

In the case 4, first, in step S441, the smart device 200 receives an instruction from a user to display detail information of an image corresponding any of thumbnails. For example, a user can input the instruction to display the detail information of the image corresponding the thumbnail by touching the display area of the thumbnail for a predetermined time length or more (referred to as long press). A long press operation is an example, and another operation may be adopted. For example, operations, such as tap, double tap (an operation performing tap twice within a predetermined time length), and tap with two fingers on the thumbnail may be adopted. It is assumed that the smart device 200 is set, before input of the instruction, to obtain an image in a size which is resized when obtaining an image.

When the instruction to display the detail information of the image corresponding to any of thumbnails is received from the user, in step S442, the smart device 200 calls the RequestContentDetailInfo API. In other words, the smart device 200 transmits to the digital camera 100 a request to obtain the detail information of the selected image after resizing. Here, the smart device 200 requests the detail information of the resized image obtained by resizing the image identified by the image ID from the digital camera 100 using the image ID corresponding to the thumbnail selected by the user in step S441 as an argument. The value indicating "resizing" is used as the argument of the image size.

In response to the request, in step S443, the digital camera 100 executes processing corresponding to the RequestContentDetailInfo shown in FIG. 3A and transmits the detail information of the resized image to the smart device 200. In other words, the digital camera 100 resizes the image identified by the image ID included in the request, analyzes a result, and generates metadata of the resized image. Then, the digital camera 100 transmits the generated metadata to the smart device 200. In addition to the transmission, the digital camera 100 executes processing in step S444

In step S444, the digital camera 100 stores the image data resized in step S443 in the working memory 104. Accordingly, if a user requests the resized image later, there is no need to perform resizing processing again, and the digital camera 100 can handle the request smoothly.

On the other hand, the smart device 200 which received the detail information of the resized image displays the detail information of the resized image based on the detail information received from the digital camera 100. Accordingly, for example, the metadata of the resized image is displayed by overlapping with the thumbnail list as in a screen 458 on the display unit 206 of the smart device 200.

If an instruction to display metadata of a resized image corresponding to a different thumbnail is further input in this state, the processing in step S442 and step S443 is repeated to obtain the detail information of the resized image corresponding to the thumbnail and the detail information is displayed. In accordance with the processing, the detail information already displayed is turned into non-display. It is because displaying a plurality of detail information pieces makes thumbnails difficult to view. In addition, when the detail information of the resized image corresponding to the different thumbnail is requested, the digital camera 100 discards the detail information of the resized image stored in step S444, and stores the resized image of which detail information is newly requested by the repeated processing in step S444.

Next, in step S445, the smart device 200 receives an instruction to perform preview display of any image among thumbnails displayed on the screen 458. For example, a user can select a desired image based on information, such as contents of the displayed thumbnails and metadata confirmable by the processing in step S441 to step S443, and instruct confirmation of contents of the image in a larger size. For the input of the instruction, for example, a double tap operation on a thumbnail can be adopted. For this operation, another operation may be adopted as long as the operation can be distinguished from the instruction to obtain the detail information in step S441.

In step S446, the smart device 200 which received the instruction to perform preview display of the image calls the RequestContent API using the image ID of the image instructed in step S446. The value indicating "resizing" is used as the argument of the image size.

In response to the request, in step S447, the digital camera 100 executes processing corresponding to the RequestContent shown in FIG. 3A and transmits the image data to the smart device 200. Since the resized image data is already stored in step S444, the digital camera 100 can transmit the resized image to the smart device 200 without performing the resizing processing again.

The smart device 200 which received the resized image performs preview display of the selected image on the display based on the image data received from the digital camera 100. Accordingly, for example, a single image is displayed in a screen as illustrated in a screen 459 on the display unit 206 of the smart device 200.

Thus, the case 4 has been described above.

As described above, information which is highly likely to be requested later is prepared in advance, so that a response to a user instruction can be quickened.

<Operations of Digital Camera 100>

Figure 5B:
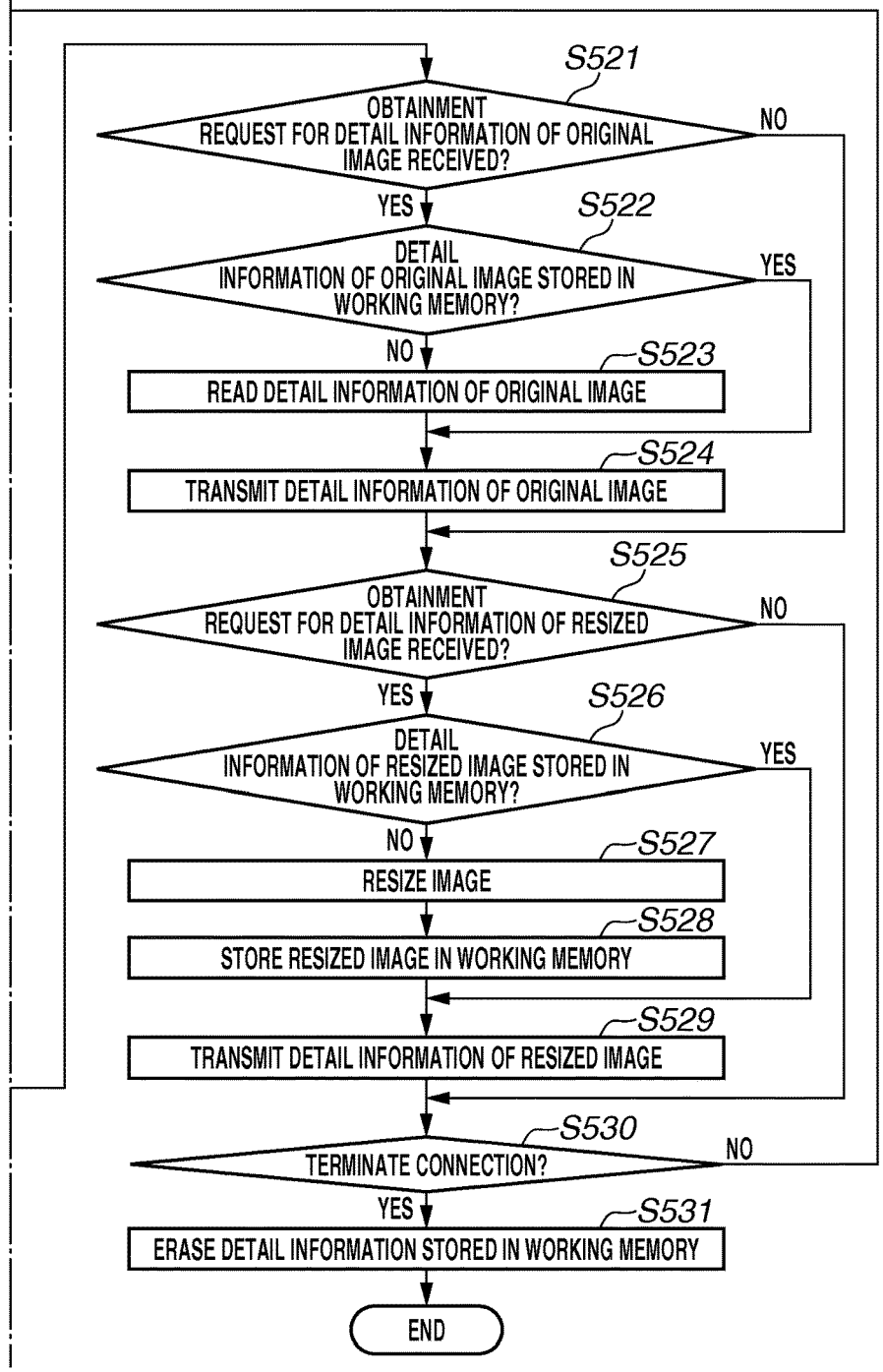
FIG. 5 (including FIGS. 5A and 5B) is a flowchart illustrating operations of the digital camera according to the first exemplary embodiment.

Next, operations of the digital camera 100 for realizing the procedures illustrated in FIG. 4 are described. FIG. 5 (including FIGS. 5A and 5B) is a flowchart illustrating the operations of the digital camera 100 according to the present exemplary embodiment. Each processing in the flowchart is realized by the control unit 101 developing a program stored in the nonvolatile memory 103 in the working memory 104 and executing the program. Further, the processing in the flowchart is started in response to receiving an instruction to establish the wireless LAN communication with the smart device 200 by, for example, the menu operation made by a user.

First, in step S501, the control unit 101 determines whether the wireless LAN communication is established with the smart device 200 via the communication unit 111. The establishment of the wireless LAN communication means that an instruction to start the wireless LAN communication is input to the digital camera 100, and the communication between the digital camera 100 and the smart device 200 is established through generation of the network and a search for devices in the network. If the control unit 101 determines that the wireless LAN communication is not established (NO in step S501), the processing in step S501 is repeated until the wireless LAN communication is established. On the other hand, if the control unit 101 determines that the wireless LAN communication is established (YES in step S501), the processing proceeds to step S502. The processing in step S501 corresponds to that in step S401 and step S402 in FIG. 4.

Next, in step S502, the control unit 101 determines whether a request RequestProductInfo for obtaining the product information of the digital camera 100 is received from the smart device 200 via the communication unit 111. If the control unit 101 determines that the request is received (YES in step S502), the processing proceeds to step S503. If the control unit 101 determines that the request is not received (NO in step S502), the processing proceeds to step S504 by skipping step S503.

In step S503, the control unit 101 reads the product name, the manufacturer name, the firmware version, the serial number, and the like stored in the nonvolatile memory 103 in response to the reception of the request and transmits these information pieces to the smart device 200 as a response. The processing in step S503 corresponds to that in step S404 in FIG. 4.

Next, in step S504, the control unit 101 determines whether a request RequestMemoryInfo for obtaining the storage area information of the digital camera 100 is received from the smart device 200 via the communication unit 111. If the control unit 101 determines that the request is received (YES in step S504), the processing proceeds to step S505. If the control unit 101 determines that the request is not received (NO in step S504), the processing proceeds to step S506 by skipping step S505.

In step S505, in response to the reception of the request, the control unit 101 transmits the storage area ID, the storable capacity, the free capacity, the number of stored contents, and the like to the smart device 200 via the communication unit 111 as a response to the request RequestMemoryInfo. The processing in step S505 corresponds to that in step S406 in FIG. 4.

In step S506, the control unit 101 determines whether a request RequestContentInfo for obtaining the management information of the image stored in the digital camera 100 is received from the smart device 200 via the communication unit 111. If the control unit 101 determines that the request is received (YES in step S506), the processing proceeds to step S507. If the control unit 101 determines that the request is not received (NO in step S506), the processing proceeds to step S509. The processing in step S509 is described below.

In step S507, the control unit 101 reads the management information of the instructed image from the directory entry among the management information pieces stored in the storage medium 110.

Next, in step S508, the control unit 101 transmits the management information read in step S507 to the smart device 200 via the communication unit 111 as a response to the request RequestContentInfo. The processing in step S508 corresponds to that in step S408 in FIG. 4.

Next, in step S509, the control unit 101 determines whether an obtainment request of a thumbnail of the image is received from the smart device 200 via the communication unit 111. More specifically, the control unit 101 determines whether a RequestContent using a string "THUMBNAIL" as an argument is received. If the control unit 101 determines that the request is received (YES in step S509), the processing proceeds to step S510. If the control unit 101 determines that the request is not received (NO in step S509), the processing proceeds to step S512. The processing in step S512 is described below.

In step S510, the control unit 101 analyzes a header of the requested image and reads a thumbnail.

Next, in step S511, the control unit 101 transmits the thumbnail of the image read in step S510 to the smart device 200 via the communication unit 111 as a response to the RequestContent. The processing in step S511 corresponds to that in step S410 in FIG. 4.

Next, in step S512, the control unit 101 determines whether an obtainment request of the image in the original size is received from the smart device 200 via the communication unit 111. More specifically, the control unit 101 determines whether the RequestContent using a value indicating "original" as an argument is received. If the control unit 101 determines that the request is received (YES in step S512), the processing proceeds to step S513. If the control unit 101 determines that the request is not received (NO in step S512), the processing proceeds to step S516. The processing in step S516 is described below.

In step S513, the control unit 101 reads the image data identified by the image ID included in the request.

Next, in step S514, the control unit 101 stores the detail information of the image read in step S513 to the working memory 104. The detail information is read in advance as described above, because it can be thought that the detail information is highly likely to be requested with the request of the image. Accordingly, a response speed when the detail information is requested is accelerated. The processing in step S513 and step S514 corresponds to that in step S414 in FIG. 4.

Next, in step S515, the control unit 101 transmits the image data read in step S513 to the smart device 200 via the communication unit 111 without resizing the image data. A processing order of step S515 and step S514 may be reversed. In addition, the processing in step S515 and step S514 may be executed in parallel. The processing in step S515 corresponds to that in step S413 in FIG. 4.

Next, in step S516, the control unit 101 determines whether an obtainment request of a resized image is received from the smart device 200 via the communication unit 111. More specifically, the control unit 101 determines whether the RequestContent using a value indicating "resizing" as an argument is received. If the control unit 101 determines that the request is received (YES in step S516), the processing proceeds to step S517. If the control unit 101 determines that the request is not received (NO in step S516), the processing proceeds to step S521. The processing in step S521 is described below.

In step S517, the control unit 101 determines whether the resized image already requested is stored in the working memory 104. If the control unit 101 determines that the resized image is not stored (NO in step S517), the processing proceeds to step S518.

In step S518, the control unit 101 reads the image data identified by the image ID included in the request and performs resizing processing thereon. For example, the control unit 101 reduces the data size by thinning pixels of the image data. Then, the processing proceeds to step S519. On the other hand, if the control unit 101 determines that the resized image already requested is stored (YES in step S517), the processing proceeds to S519 by skipping step S518.

Next, in step S519, the control unit 101 stores the detail information of the resized image in the working memory 104. The detail information is stored in advance as described above, because it can be thought that the detail information is highly likely to be requested with the request of the image. Accordingly, the response speed when the detail information is requested is accelerated. The processing in step S518 and step S519 corresponds to that in step S434 in FIG. 4.

Next, in step S520, the control unit 101 transmits the image data resized in step S518 to the smart device 200 via the communication unit 111. A processing order of step S519 and step S520 may be reversed. In addition, the processing in step S519 and step S520 may be executed in parallel. The processing in step S520 corresponds to that in step S437 in FIG. 4.

Next, in step S521, the control unit 101 determines whether an obtainment request of the detail information of the image in the original size is received via the communication unit 111. More specifically, the control unit 101 determines whether the RequestContentDetailInfo using a value indicating "original" as an argument is received. If the control unit 101 determines that the request is received (YES in step S521), the processing proceeds to step S522. If the control unit 101 determines that the request is not received (NO in step S521), the processing proceeds to step S525. The processing in step S525 is described below.

In step S522, the control unit 101 determines whether the metadata of the image in the original size requested from the smart device 200 is stored in the working memory 104. If it is determined that the metadata is not stored (NO in step S522), then in step S523, the control unit 101 analyzes the header of the image in the original size and reads the metadata. When the metadata is stored (YES in step S522), the processing proceeds to step S524 by skipping step S523.

In step S524, the control unit 101 transmits the detail information of the requested image in the original size to the smart device 200 via the communication unit 111 as a response to the RequestContentDetailInfo. The processing in step S524 corresponds to that in step S417 and in step S426 in FIG. 4. When the processing in step S524 is executed by skipping step S523, the detail information already stored is transmitted. In this case, there is no need to execute the processing in step S523, a time from receiving the request to transmitting the metadata can be shortened compared with the case in which the processing in step S523 is executed.

Next, in step S525, the control unit 101 determines whether an obtainment request of the detail information of the resized image is received via the communication unit 111. More specifically, the control unit 101 determines whether the RequestContentDetailInfo using a value indicating "resizing" as an argument is received. If the control unit 101 determines that the request is received (YES in step S525), the processing proceeds to step S526. If the control unit 101 determines that the request is not received (NO in step S525), the processing proceeds to step S530. The processing in step S530 is described below.

In step S526, the control unit 101 determines whether the metadata of the resized image requested from the smart device 200 is stored in the working memory 104. If it is determined that the metadata is not stored (NO in step S526), then in step S527, the control unit 101 resizes the image and generates the metadata of the resized image. In step S528, the control unit 101 stores the resized image in the working memory 104 and advances the processing to step S529. On the other hand, if the control unit 101 determines that the metadata is stored (YES in step S526), the processing proceeds to step S529 by skipping step S527 and step S528.

In step S529, the control unit 101 transmits the detail information of the requested resized image to the smart device 200 via the communication unit 111 as a response to the RequestContentDetailInfo. The processing in step S529 corresponds to that in step S437 and in step S443 in FIG. 4. When the processing in step S529 is executed by skipping step S527 and step S528, the detail information already stored is transmitted. In this case, there is no need to execute the processing in step S527 and step S528, a time from receiving the request to transmitting the metadata can be shortened compared with the case in which the processing in step S527 and step S528 is executed. The stored detail information remains stored without being erased after the transmission by considering possibility that the detail information is requested again.

Next, in step S530, the control unit 101 determines whether the wireless LAN communication with the smart device 200 is disconnected. As for a case in which the wireless LAN communication is disconnected, it can be considered a case in which disconnection is explicitly instructed by a user, a case in which a signal from the smart device 200 cannot be received for a predetermined time length or more, and the like. If the control unit 101 determines that the wireless LAN communication is not disconnected (NO in step S530), the processing returns to step S502. On the other hand, if the control unit 101 determines that the wireless LAN communication is disconnected (YES in step S530), the processing proceeds to step S531.

In step S531, the control unit 101 erases the detail information and the resized image stored in the working memory 104. Then, the control unit 101 terminates the processing in the flowchart. A timing to erase the stored information is not necessarily a timing of step S531. For example, when transmission of information is finished, the information may be erased without being stored to release the memory. Alternatively, the stored information may be erased at a timing when a request for another image data is received.

Thus, the operations of the digital camera 100 according to the present exemplary embodiment have been described above.

In the above descriptions, the detail information and the resized image stored in the working memory 104 are erased at a timing when the connection is disconnected, however a timing is not limited to the timing of disconnection. For example, the detail information stored in the working memory 104 may be erased when obtainment of a different image is requested after the obtainment request of an image. In addition, according to the present exemplary embodiment, if the detail information of the resized image is requested when the detail information of the resized image is not stored, the detail information of the resized image is generated by actually resizing the image, however, provision of the detail information is not limited to this method. A value determined by predicting the detail information of the resized image may be transmitted to the smart device 200 as the detail information of the resized image.

<Operations of Smart Device 200>

Figure 6:
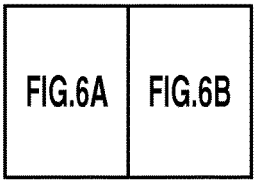
FIG. 6 (including FIGS. 6A and 6B) is a flowchart illustrating operations of the smart device according to the first exemplary embodiment.
Figure 6A:
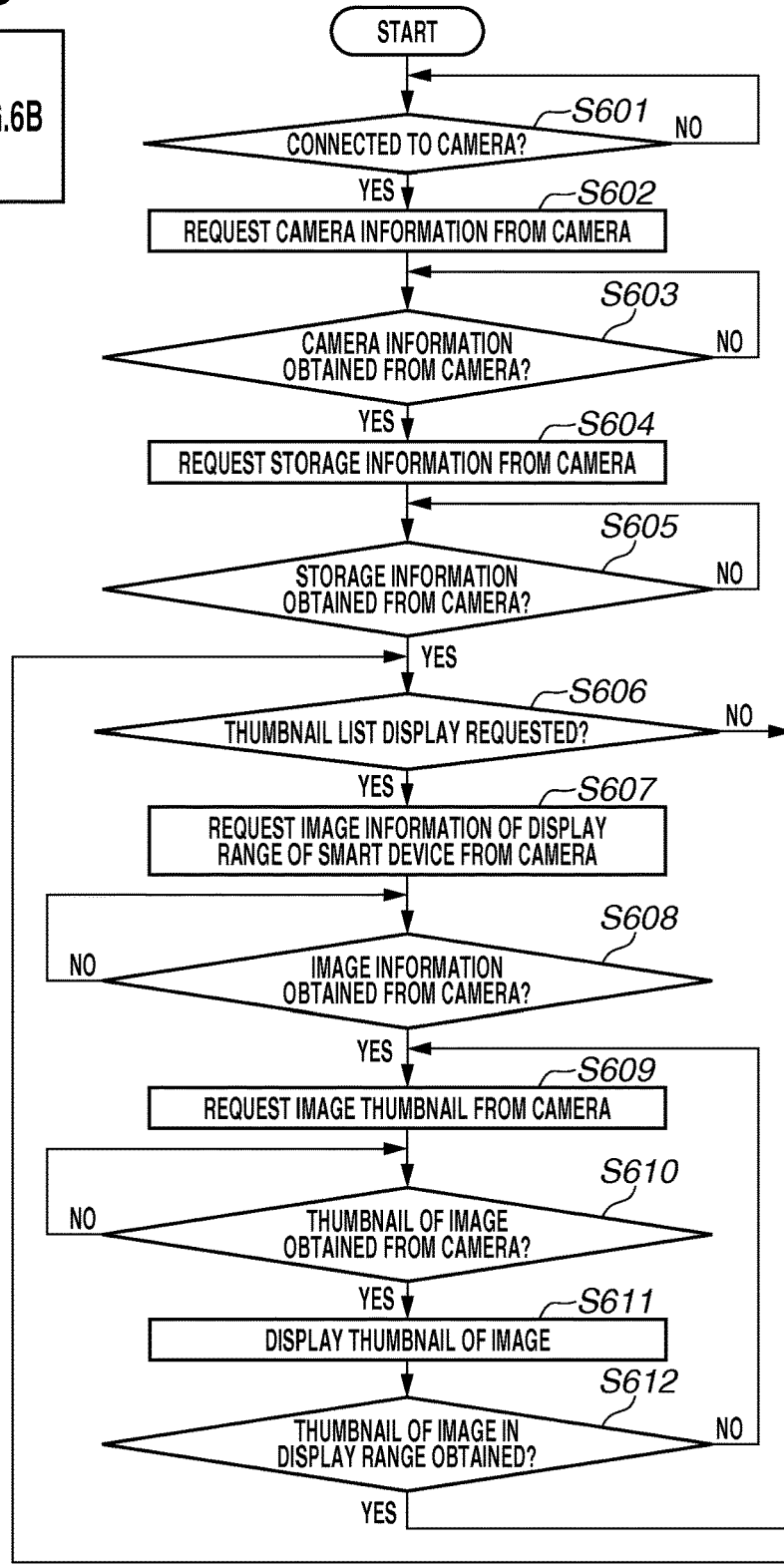

Next, operations of the smart device 200 for realizing the procedures illustrated in FIG. 4 are described. FIG. 6 (including FIGS. 6A and 6B) is a flowchart illustrating the operations of the smart device 200 according to the present exemplary embodiment. Each processing in the flowchart is realized by the control unit 201 developing a program stored in the nonvolatile memory 203 in the working memory 204 and executing the program. Further, the processing in the flowchart is started in response to receiving an instruction to establish the wireless LAN communication with the digital camera 100 by, for example, the menu operation made by a user.

First, in step S601, the control unit 201 determines whether the wireless LAN communication is established with the digital camera 100 via the communication unit 211. The establishment of the wireless LAN communication means that an instruction to start the wireless LAN communication is input, and the communication between the digital camera 100 and the smart device 200 is established through participation in the network generated by the digital camera 100 and a search for devices in the network. If the control unit 201 determines that the wireless LAN communication is not established (NO in step S601), the processing in step S601 is repeated until the wireless LAN communication is established. On the other hand, if the control unit 201 determines that the wireless LAN communication is established (YES in step S601), the processing proceeds to step S602. The processing in step S601 corresponds to that in step S401 and step S402 in FIG. 4.

Next, in step S602, the control unit 201 transmits the request RequestProductInfo to the digital camera 100 via the communication unit 211 to obtain the product information of the digital camera 100. The information transmitted in step S602 is received by the processing by the digital camera 100 in step S502 in FIG. 5. The processing in step S602 corresponds to that in step S403 in FIG. 4.

In step S603, the control unit 201 determines whether a response to the request transmitted in step S602 is received. If the control unit 201 determines that the response is not received (NO in step S603), the processing in step S603 is repeated until the response is received. If the control unit 201 determines that the response is received (YES in step S603), the processing proceeds to step S604. The received information includes the product name, the manufacturer name, the firmware version, the serial number, and others of the digital camera 100. These information pieces are displayed on the display unit 206 and used by a user to view the information such as the product name and determine characteristics of the product.

In step S604, the control unit 201 transmits a request to obtain the storage area information to the digital camera 100 via the communication unit 211. More specifically, the control unit 201 transmits the RequestMemoryInfo. The information transmitted in step S604 is received by the processing by the digital camera 100 in step S504 in FIG. 5. The processing in step S604 corresponds to that in step S405 in FIG. 4.

In step S605, the control unit 201 determines whether a response to the request transmitted in step S604 is received. If the control unit 201 determines that the response is not received (NO in step S605), the processing in step S605 is repeated until the response is received. If the control unit 201 determines that the response is received (YES in step S605), the processing proceeds to step S606. The received information includes the storage area ID, the storable capacity, the free capacity, the number of stored contents, and others. These information pieces enable the smart device 200 to determine the number of contents stored in the storage medium 110 of the digital camera 100 and a storage area ID to access the storage. When the number of contents is recognized, the smart device 200 can determine how much a display area of the display unit 206 is needed to be secured.

Next, in step S606, the control unit 201 determines whether an instruction to display the thumbnail list is received from a user via the operation unit 205. If the control unit 201 determines that the instruction is received (YES in step S606), the processing proceeds to step S607. If the control unit 201 determines that the instruction is not received (NO in step S606), the processing proceeds to step S613. The processing in step S613 is described below.

In step S607, the control unit 201 transmits to the digital camera 100 via the communication unit 211 an obtainment request of the management information for the number of information pieces displayable on the display unit 206. More specifically, the control unit 201 transmits the RequestContentInfo to the digital camera 100. As an argument of the RequestContentInfo, the storage area ID obtained in step S605 is specified. The processing in step S607 corresponds to that in step S407 in FIG. 4.

Next, in step S608, the control unit 201 determines whether the obtainment of the management information from the digital camera 100 via the communication unit 211 is completed. If the control unit 201 determines that the obtainment is not completed (NO in step S608), the processing in step S608 is repeated until the obtainment is completed. If the control unit 201 determines that the obtainment is completed (YES in step S608), the processing proceeds to step S609. The information obtained as the management information includes the content ID. The content ID is information for identifying the image when the smart device 200 requests the original image and the detail information from the digital camera 100.

In step S609, the control unit 201 transmits an obtainment request of the thumbnail of the image to the digital camera 100 via the communication unit 211. More specifically, the control unit 201 transmits to the digital camera 100 the RequestContent using a THUMBNAIL as an argument of the image size. The processing in step S609 corresponds to that in step S409 in FIG. 4.

In step S610, the control unit 201 determines whether obtainment of the thumbnail requested in step S609 via the communication unit 211 is completed. If the control unit 201 determines that the obtainment is not completed (NO in step S610), the processing in step S610 is repeated until the obtainment is completed. If the control unit 201 determines that the obtainment is completed (YES in step S610), the processing proceeds to step S611.

In step S611, the control unit 201 displays the thumbnail of the image on the display unit 206.

Next, in step S612, the control unit 201 determines whether all of the thumbnails and the detail information pieces of the images in the display range of the display unit 206 are completely obtained. For example, when fifteen thumbnails are displayed in the display range, it is determined whether the thumbnails and the detail information are obtained fifteen pieces each. If the control unit 201 determines that the obtainment is not completed (NO in step S612), the processing returns to step S609, and the processing in step S609 to step S612 is repeated to obtain and display remaining thumbnails and detail information pieces. Accordingly, every time one thumbnail is obtained and displayed, the detail information of the image corresponding to the thumbnail is obtained and displayed. As a result, the thumbnail and the detail information are alternately displayed, and finally, the thumbnail list screen as illustrated in the screen 451 is displayed.

Next, in step S613, the control unit 201 determines whether an instruction to perform preview display of an image is received from a user via the operation unit 205. For example, when a touch with two fingers is detected at a position on the touch panel corresponding to the display area of the thumbnail, the control unit 201 determines that an instruction to perform preview display of an image corresponding to the thumbnail is received. If the control unit 201 determines that the instruction is received (YES in step S613), the processing proceeds to step S614. If the control unit 201 determines that the instruction is not received (NO in step S613), the processing proceeds to step S621. The processing in step S621 is described below.

In step S614, the control unit 201 determines an image size to obtain. More specifically, the control unit 201 reads a setting value of the image size set in advance by the menu operation and determines whether the setting is to obtain an image in an original size or to obtain a resized image. If the control unit 201 determines as the setting to obtain an image in an original size ("ORIGINAL IMAGE OBTAINMENT" in step S614), the processing proceeds to step S615.

In step S615, the control unit 201 transmits an obtainment request of the image data to the digital camera 100 via the communication unit 211. More specifically, the control unit 201 transmits to the digital camera 100 the RequestContent using "original" as an argument of the image size. The processing in step S615 corresponds to that in, for example, step S411 and step S425 in FIG. 4.

Next, in step S616, the control unit 201 determines whether obtainment of the image data requested in step S615 via the communication unit 211 is completed. If the control unit 201 determines that the obtainment is not completed (NO in step S616), the processing in step S616 is repeated until the obtainment is completed. If the control unit 201 determines that the obtainment is completed (YES in step S616), the processing proceeds to step S617.

In step S617, the control unit 201 displays the image data in the original size on a screen of the display unit 206. Accordingly, a preview of an image is displayed on the screen, for example, as illustrated in the screen 452 in FIG. 4. Then, the processing proceeds to step S629. The processing in step S629 is described below.

On the other hand, in step S614, if the control unit 201 determines as the setting to obtain a resized image ("RESIZED IMAGE OBTAINMENT" in step S614), the processing proceeds to step S618.

In step S618, the control unit 201 transmits an obtainment request of the image data to the digital camera 100 via the communication unit 211. More specifically, the control unit 201 transmits to the digital camera 100 the RequestContent using "resizing" as an argument of the image size. The processing in step S618 corresponds to that in, for example, step S433 and step S446 in FIG. 4.

Next, in step S619, the control unit 201 determines whether obtainment of the image data requested in step S618 via the communication unit 211 is completed. If the control unit 201 determines that the obtainment is not completed (NO in step S619), the processing in step S619 is repeated until the obtainment is completed. If the control unit 201 determines that the obtainment is completed (YES in step S619), the processing proceeds to step S620.

In step S620, the control unit 201 displays the resized image on a screen of the display unit 206. Accordingly, a preview of an image is displayed on the screen, for example, as illustrated in the screen 452 in FIG. 4. Then, the processing proceeds to step S629. The processing in step S629 is described below.

Next, the processing in step S621 and subsequent steps is described below which is executed when it is determined that an instruction to perform preview display is not received in step S613.

In step S621, the control unit 201 determines whether an instruction to display the detail information of the image is received from a user via the operation unit 205. For example, when a position on the touch panel corresponding to the display area of the thumbnail is touched for a predetermined time length, the control unit 201 determines that an instruction to display the detail information of the image corresponding to the thumbnail is received. If the control unit 201 determines that the instruction is received (YES in step S621), the processing proceeds to step S622. If the control unit 201 determines that the instruction is not received (NO in step S621), the processing proceeds to step S629. The processing in step S629 is described below.

In step S622, the control unit 201 determines whether to obtain the detail information of the image in the original size or to obtain the detail information of the resized image. More specifically, the control unit 201 reads a setting value of an image size to be obtained set in advance by the menu operation and determines whether the setting is to obtain an image in an original size or to obtain a resized image. If the control unit 201 determines as the setting to obtain an image in an original size ("ORIGINAL IMAGE OBTAINMENT" in step S622), the processing proceeds to step S623.

In step S623, the control unit 201 transmits an obtainment request of the detail information of the image to the digital camera 100 via the communication unit 211. More specifically, the control unit 201 transmits the RequestContentDetailInfo using the image ID corresponding to the thumbnail to which the instruction is received in step S621 as an argument. In addition, a value indicating "original" is used as an argument of the image size. The processing in step S623 corresponds to that in, for example, step S412 and step S425 in FIG. 4.

Next, in step S624, the control unit 201 determines whether the obtainment of the detail information from the digital camera 100 via the communication unit 211 is completed. If the control unit 201 determines that the obtainment is not completed (NO in step S624), the processing in step S624 is repeated until the obtainment is completed. If the control unit 201 determines that the obtainment is completed (YES in step S624), the processing proceeds to step S625.

In step S625, the control unit 201 displays the detail information of the image in the original size received in step S624 on the display unit 206. Accordingly, for example, the detail information of the image in the original size is displayed by overlapping with the image in the original size in the preview display as illustrated in the screen 453 in FIG. 4. Then, the processing proceeds to step S629. The processing in step S629 is described below.

On the other hand, in step S622, if the control unit 201 determines as the setting to obtain a resized image ("RESIZED IMAGE OBTAINMENT" in step S622), the processing proceeds to step S626.

In step S626, the control unit 201 transmits an obtainment request of the detail information of the image to the digital camera 100 via the communication unit 211. More specifically, the control unit 201 transmits the RequestContentDetailInfo using the image ID corresponding to the thumbnail to which the instruction is received in step S621 as an argument. In addition, a value indicating "resizing" is used as an argument of the image size. The processing in step S626 corresponds to that in, for example, step S436 and step S442 in FIG. 4.

Next, in step S627, the control unit 201 determines whether the obtainment of the detail information from the digital camera 100 via the communication unit 211 is completed. If the control unit 201 determines that the obtainment is not completed (NO in step S627), the processing in step S627 is repeated until the obtainment is completed. If the control unit 201 determines that the obtainment is completed (YES in step S627), the processing proceeds to step S628.

In step S628, the control unit 201 displays the detail information of the resized image received in step S624 on the display unit 206. Accordingly, for example, the detail information of the resized image is displayed by overlapping with the resized image in the preview display as illustrated in the screen 457 in FIG. 4. Then, the processing proceeds to step S629.

In step S629, the control unit 201 determines whether the wireless LAN communication with the digital camera 100 is disconnected. As for a case in which the wireless LAN communication is disconnected, it can be considered a case in which disconnection is explicitly instructed by a user, a case in which a signal from the digital camera 100 cannot be received for a predetermined time length or more, and the like. If the control unit 201 determines that the wireless LAN communication is not disconnected (NO in step S629), the processing returns to step S606. On the other hand, if the control unit 201 determines that the wireless LAN communication is disconnected (YES in step S629), the control unit 201 terminates the processing in the flowchart.

Thus, the operations of the smart device 200 according to the present exemplary embodiment have been described above.

As described above, according to the present exemplary embodiment, resizing of an image and generation of metadata of the resized image are executed in advance when a request is received which is highly likely to be requested later. Accordingly, a response to an instruction from a user can be performed promptly.

Other Embodiments

In addition to the above-described exemplary embodiment, a following instruction may be newly received during resizing of an image (during execution of the processing, for example, in step S518 and step S527 in FIG. 5). For example, it can be considered to receive a request for a resized image different from the image being resized. If a request for a different resized image is received, resizing processing of the image being resized is stopped at that time, and resizing processing is executed for the different resized image newly requested. Accordingly, the digital camera 100 can correspond more smoothly with respect to an operation of the smart device 200.

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-179323, filed Sep. 3, 2014, which is hereby incorporated by reference herein in its entirety.

What is claimed is:

1. A communication apparatus comprising:
a communication unit configured to communicate with an external apparatus;
one or more processors; and
one or more memory devices storing executable instructions, which when executed by the one or more processors, cause the communication apparatus to:
receive, from the external apparatus, a request for a resized image of image data recorded in a storage medium;
in response to the request for a resized image, (a) generate a resized image by reading the image data from the storage medium, (b) transmit the resized image to the external apparatus, (c) generate metadata of the resized image, and (d) temporarily store the metadata of the resized image;
receive, from the external apparatus, a request for information of the resized image; and
in response to a request from the external apparatus for information of the resized image, transmit the stored metadata of the resized image to the external apparatus without generating metadata again and without transmitting, together with the metadata of the resized image transmitted to the external apparatus, the resized image data.

2. The communication apparatus according to claim 1, wherein the stored metadata of the resized image remains stored after the metadata of the resized image is transmitted to the external apparatus.

3. The communication apparatus according to claim 1, wherein
in a case where communication with the external apparatus is disconnected in a state in which the resized image or metadata of the resized image is stored, the stored resized image or the stored metadata of the resized image is discarded.

4. The communication apparatus according to claim 1, wherein
in a case where a request for another image is received from the external apparatus in a state in which the resized image or metadata of the resized image is stored, the stored resized image or the stored metadata of the resized image is discarded.

5. The communication apparatus according to claim 1, wherein the metadata includes information of an image size.

6. The communication apparatus according to claim 1, further comprising an image capturing unit,
wherein the image data is generated by the image capturing unit.

7. The communication apparatus according to claim 1, wherein the communication unit comprises a communication interface for wireline communication between the communication apparatus and the external apparatus.

8. The communication apparatus according to claim 1, wherein the communication unit enables the communication apparatus to wirelessly communicate with the external apparatus.

9. The communication apparatus according to claim 8, wherein the communication unit enables short-range wireless communication between the communication apparatus and the external apparatus.

10. The communication apparatus according to claim 1, wherein the storage medium is included in the communication apparatus.

11. The communication apparatus according to claim 1, wherein the storage medium is detachable from the communication apparatus.

12. The communication apparatus according to claim 1, wherein
if a metadata request regarding an image for which no metadata is temporarily stored is received, a resized image is generated, metadata is generated, the metadata is transmitted without transmitting the resized image, and the resized image is temporarily stored.

13. A communication apparatus comprising:
a communication unit configured to communicate with an external apparatus;
one or more processors; and
one or more memory devices storing executable instructions, which when executed by the one or more processors, cause the communication apparatus to:
receive, from the external apparatus, a request for information of a resized image of image data recorded in a storage medium;
in response to the request for information of a resized image, (a) generate a resized image and metadata of the resized image by reading the image data from the storage medium, (b) transmit the metadata of the resized image to the external apparatus without transmitting, together with the metadata of the resized image transmitted to the external apparatus, the resized image to the external apparatus, and (c) temporarily store the resized image; and
in response to a request from the external apparatus for the resized image, transmit the stored resized image to the external apparatus.

14. The communication apparatus according to claim 13, wherein the metadata of the resized image remains stored after the metadata of the resized image is transmitted to the external apparatus.

15. The communication apparatus according to claim 13, wherein
in a case where communication with the external apparatus is disconnected in a state in which the resized image or metadata of the resized image is stored, the stored resized image or the stored metadata of the resized image is discarded.

16. The communication apparatus according to claim 13, wherein
in a case where a request for another image is received from the external apparatus in a state in which the resized image or metadata of the resized image is stored, the stored resized image or the stored metadata of the resized image is discarded.

17. A method for controlling a communication apparatus configured to communicate with an external apparatus, the method comprising:
receiving, from the external apparatus, a request for a resized image of image data recorded in a storage medium;
in response to the request for a resized image, (a) generating a resized image by reading the image data from the storage medium, (b) transmitting the resized image to the external apparatus, (c) generating metadata of the resized image, and (d) temporarily storing the metadata of the resized image;
receiving, from the external apparatus, a request for information of the resized image; and
in response to a request from the external apparatus for information of the resized image, transmitting the stored metadata of the resized image to the external apparatus without generating metadata again and without transmitting, together with the metadata of the resized image transmitted to the external apparatus, the resized image data.

18. A method for controlling a communication apparatus configured to communicate with an external apparatus, the method comprising:
receiving, from the external apparatus, a request for information of a resized image of image data recorded in a storage medium;
in response to the request for information of a resized image, (a) generating a resized image and metadata of the resized image by reading the image data from the storage medium, (b) transmitting the metadata of the resized image to the external apparatus without transmitting, together with the metadata of the resized image transmitted to the external apparatus, the resized image to the external apparatus, and (c) temporarily storing the resized image; and
in response to a request from the external apparatus for the resized image, transmitting the stored resized image to the external apparatus.

19. A non-transitory computer-readable storage medium storing computer executable instructions for causing a computer to execute a method for controlling a communication apparatus configured to communicate with an external apparatus, the method comprising:

receiving, from the external apparatus, a request for a resized image of image data recorded in a storage medium;

in response to a request for a resized image, (a) generating a resized image by reading the image data from the storage medium, (b) transmitting the resized image to the external apparatus, (c) generating metadata of the resized image, and (d) temporarily storing the metadata of the resized image;

receiving, from the external apparatus, a request for information of the resized image; and in response to a request from the external apparatus for information of the resized image, transmitting the stored metadata of the resized image to the external apparatus without generating metadata again and without transmitting, together with the metadata of the resized image transmitted to the external apparatus, the resized image data.

20. A non-transitory computer-readable storage medium storing computer executable instructions for causing a computer to execute a method for controlling a communication apparatus configured to communicate with an external apparatus, the method comprising:

receiving, from the external apparatus, a request for information of a resized image of image data recorded in a storage medium;

in response to the request for information of a resized image, (a) generating a resized image and metadata of the resized image by reading the image data from the storage medium, (b) transmitting the metadata of the resized image to the external apparatus without transmitting, together with the metadata of the resized image transmitted to the external apparatus, the resized image to the external apparatus, and (c) temporarily storing the resized image; and in response to a request from the external apparatus for the resized image, transmitting the stored resized image to the external apparatus.

* * * * *